(12) United States Patent
Petrack et al.

(10) Patent No.: US 7,412,486 B1
(45) Date of Patent: Aug. 12, 2008

(54) METHODS AND APPARATUS PROVIDING A WEB BASED MESSAGING SYSTEM

(75) Inventors: Scott B. Petrack, Brookline, MA (US); Joshua Poritz, Brookline, MA (US)

(73) Assignee: EDIAL, Inc., Newton, MA (US)

( * ) Notice: Subject to any disclaimer, the term of this patent is extended or adjusted under 35 U.S.C. 154(b) by 823 days.

(21) Appl. No.: 10/242,507

(22) Filed: Sep. 12, 2002

Related U.S. Application Data

(60) Provisional application No. 60/340,234, filed on Dec. 14, 2001.

(51) Int. Cl.
G06F 15/16 (2006.01)

(52) U.S. Cl. .......................... 709/206; 709/202; 709/203

(58) Field of Classification Search ......... 709/204–205, 709/227–228
See application file for complete search history.

(56) References Cited

U.S. PATENT DOCUMENTS

| | | | | |
|---|---|---|---|---|
| 5,943,478 | A * | 8/1999 | Aggarwal et al. ............... | 726/3 |
| 6,304,898 | B1 * | 10/2001 | Shiigi ........................... | 709/206 |
| 6,490,626 | B1 * | 12/2002 | Edwards et al. .............. | 709/229 |
| 6,823,197 | B1 * | 11/2004 | Chen et al. ................ | 455/554.1 |
| 7,143,140 | B2 * | 11/2006 | Dennis ........................ | 709/206 |
| 7,185,058 | B2 * | 2/2007 | Blackwell et al. ........... | 709/206 |
| 2001/0027474 | A1 * | 10/2001 | Nachman et al. ............ | 709/204 |
| 2002/0026474 | A1 * | 2/2002 | Wang et al. ................. | 709/203 |
| 2002/0083127 | A1 * | 6/2002 | Agrawal ..................... | 709/203 |
| 2002/0194272 | A1 * | 12/2002 | Zhu ............................ | 709/204 |
| 2003/0140090 | A1 * | 7/2003 | Rezvani et al. .............. | 709/203 |
| 2004/0152477 | A1 * | 8/2004 | Wu et al. .................... | 455/466 |
| 2004/0259531 | A1 * | 12/2004 | Wood et al. .............. | 455/412.1 |

OTHER PUBLICATIONS

Newton's Telecom Dictionary, 18th edition, copyright 2002, p. 408 (terms: Java, Java VM, JavaScript).*
Microsoft Computer Dictionary, 5th edition, copyright 2002, pp. 293-295 (terms: Java, Java VM, JavaScript).*

* cited by examiner

Primary Examiner—Bunjob Jaroenchonwanit
Assistant Examiner—Angela Widhalm

(57) ABSTRACT

Mechanisms and techniques provide a system for performing messaging between a message server and a message client. Embodiments operate to receive a first message to be sent to a messaging client and establish a first connection to the messaging client. The system then transmits a message processing script and the first message over the first connection to the messaging client. The message processing script enables the messaging client to display the first message and to receive and display at least one second message over the first connection to the messaging client. The system maintains the first connection in an open state after transmitting the first message to the messaging client. The system then receives a second message to be sent to the messaging client and transmits the second message over the first connection to the messaging client for receipt by the message processing script, while continuing to maintain the first connection in an open state. This can be repeated for subsequent messages using the same connection.

39 Claims, 7 Drawing Sheets

```
                                    135-1

INBOUND M1: "HI BILL, ARE YOU THERE, THIS IS BOB?"
OUTBOUND M1: "YES BOB, THIS IS BILL, WHAT'S UP?"
INBOUND M2: "CAN I CALL YOU NOW BILL ON YOUR PHONE"
OUTBOUND M2: "SURE, I CAN TALK FOR A BIT"
INBOUND M3: CALL CONTROL: INCOMING CALL FROM BOB: ANSWER Y/N?
INBOUND M4: CALL CONTROL: CALL ANSWERED - CONNECTED TO BILL
INBOUND M5: CALL CONTRLL: ELAPSED CALL TIME: 5:00
INBOUND M6: CALL CONTROL: CALL ENDED - TOTAL TIME: 7:34
OUTBOUND M3: "I FORGOT TO TELL YOU BOB - BRING FOOD"
INBOUND M7: "OK BILL, SEE YOU AT THE MEETING FRIDAY
INBOUND M8: MESSAGE CONTROL: MESSAGE SESSION ENDED

136
ENTER OUTBOUND MESSAGE: _
```

FIG. 5

METHODS AND APPARATUS PROVIDING A WEB BASED MESSAGING SYSTEM

CLAIM TO BENEFIT OF FILING DATE OF PROVISIONAL PATENT APPLICATION

This application claims the benefit of the filing date of U.S. Provisional Application for Patent having Ser. No. 60/340,234, filed Dec. 14, 2001 and entitled "METHODS AND APPARATUS PROVIDING A WEB BASED MESSAGING SYSTEM," the entire disclosure and teachings of which are hereby incorporated by reference herein.

FIELD OF THE INVENTION

The present invention relates to computer network-based messaging systems. More particularly, the present invention relates to systems that provide client-client and client-server messaging capabilities over a computer network such as the Internet.

BACKGROUND OF THE INVENTION

A typical conventional instant messaging (IM) system operates between two or more computer systems coupled to a computer network to allow users of such computers to quickly exchange messages such as text messages in a reliable and efficient manner. Typical examples of conventional instant messaging systems include "AOL instant messenger", "MSN Messenger", "Lotus Sametime" and the like. Each of these conventional systems has a number of characteristics that they share in common with each other.

Generally, such conventional instant messaging systems provide a set of real-time computer client messaging applications (i.e., software programs) that enable a group of computer users to send messages between each other (i.e., between the client computers) as long as the client computers that operate such client messaging applications are all connected in some fashion or another to a computer network such as the Internet. Such messaging client applications can operate on a wide variety of computing platforms, including personal computers, workstations, cell-phones and personal digital assistants (PDAs), laptop computers, and the like. Such client-based IM software applications may comprise one or more applets (e.g., downloadable messaging Java programs), downloadable executable messaging programs (e.g., messaging executables), browser plug-ins, or other such applications that a user of a client computer system downloads and installs and/or otherwise obtains and installs onto his or her client computer system in order to enable his or her client computer to partake in messaging exchange with other client computer systems. The other client computer systems also must download a similar and compatible messaging client application in order for the messaging system to properly function.

Conventional messaging client software applications typically use a specialized messaging protocol for exchange of instant messages between one client and an messaging server operating within an messaging service provider facility. Upon receipt of an instant message from one client, the messaging server software can use a similar proprietary protocol to forward the instant message to the recipient client's messaging software in a real-time or near-real-time manner such that the recipient client receives and can then respond to the instant message with a return instant message.

As a specific example, when a first user enters a text message into his or her messaging client application and selects a "send" function to have this instant message transmitted to another user's (i.e., a second user's) messaging client application (i.e., operating on that other user's client computer system), the first user's client application creates a connection, such as a TCP/IP connection, to an messaging server. The first user's messaging client application uses this connection to transmit the instant message entered by the first user to the messaging server and then closes the connection to the messaging server. Upon receipt of an instant message in this manner, the messaging server determines which recipient computer system is to receive the instant message and then establishes a connection to that the messaging client application operating on that second users (i.e., the recipient's) computer. The messaging server then transmits the instant message over the connection to the second users messaging client application and closes the connection. In this manner, conventional messaging client software applications interact with messaging server software that relays instant messages between clients over respective connections to give the perception to those clients of an messaging "conversation" which takes place between users.

SUMMARY OF THE INVENTION

Conventional messaging system platforms (i.e., messaging client software applications and associated server applications) suffer from a variety of deficiencies. In particular, conventional messaging systems require that developers of messaging client software applications write different versions of such client applications specifically for each separate computerized device platform upon which the messaging system is to operate. As an example, to support messaging on both Windows-based computer systems and UNIX-based computer systems, messaging system developers must create messaging client software applications for both types of platforms and possibly for different variance of the operating systems and each of such computing system platforms (i.e., different versions of the messaging software for the different versions of Windows and UNIX that exist). Due to the complexity of conventional messaging client software applications, the creators of such messaging systems must thus write client applications for each different type of computing platforms for which they wish to provide messaging capability to users of such computing platforms.

In addition, for a user computer to be provided with messaging capability using conventional messaging system technology, the user must configure his or her client computer system to support messaging by downloading and installing the proper messaging client software application. This can require a complex process of obtaining the messaging client software application by either downloading such software or by installing a from a removable media such as a CD-ROM. As an example, a user that has a personal computer that operates a Windows XP software operating system must download and install a "Windows XP" version of an messaging client software application, whereas a user that operates a computer that runs Unix must download a proper "Unix" version of the messaging client software. Such messaging client software occupies space within the users computer system and installation of such software can prove error-prone. Furthermore, if new features are added to the messaging system, the user is required to reinstall or upgrade the messaging client application to obtain the use of such new messaging features. Also, since such applications are executables, they are susceptible to attack by computer viruses that might maliciously be incorporated into a new version of the messaging client software. When the user downloads and installs such software, the corrupted versions might obtain access to computer system resources that expose vulnerabilities of the computer.

In conventional messaging systems such as Java-based systems, the user may not be required to manually download and install an executable program since a Web browser can obtain and operate a Java applet that supports the messaging system without requiring specific user permission or interaction to do so. However, Java-based messaging systems suffer from other deficiencies.

Generally, Java is a computer language that requires a "virtual machine" to be specially and specifically designed and installed on the computer or other platform in order to run or interpret the Java code. It is to be understood that Java should not be confused with JavaScript. JavaScript is a simple scripting language that conventional Web browsers support natively, whereas Java is a full-blown programming language that requires installation and operation of a Java virtual machine in order to operate. Though Java is intended to be a write-once run-anywhere computing paradigm, it is well known that it can be a very difficult task to make a Java application that can run universally on any device. Java is quite complex and thus it is difficult to run an acceptable version of Java, for example, on inexpensive or small computing platforms that have limited processing resources such as personal digital assistant (PDA) devices. Thus, while Java is still widely used, it is not the case that every data-connected device can support an application (i.e., an applet) written in Java since such applets require extensive Java virtual machine resources to be installed and enabled on client platforms in order for downloaded Java applets to properly operate.

As a result of these issues, conventional messaging systems are implemented using more advanced technologies other than the simple baseline capabilities available to most all devices. One reason for this is that conventional messaging systems are designed to operate complex proprietary messaging encoding formats and proprietary protocols used to exchange instant messages to support the complex array of features provided by such systems. As an example, developers of conventional messaging systems typically include advanced features such as billing and access control. Conventional out-of-the-box or off-the shelf communications technologies such a web browser that can transfer and render Hypertext Markup Language (HTML) pages using the Hypertext Transport Protocol (HTTP) and that can support basic JavaScript functionality are thought by conventional messaging system designers to be generally insufficient on their own for development and support of advanced messaging features.

The present invention is based in part of the observation that baseline off-the-shelf communications technologies such as standard web browser functionality, HTML, HTTP and the JavaScript are provided within almost all "data-connected" devices now being built, ranging from cell phones and small PDAs up to personal computers and powerful workstations. Because of this, embodiments of the invention provide an messaging system developed using these or equivalent core or baseline technologies.

In particular, embodiments of the invention provide methods and apparatus for processing message data. One embodiment operates in a messaging server and provides a method for processing message data that comprises the steps of receiving a first message to be sent to a messaging client and establishing a first connection to the messaging client. The first connection may be, for example, a long-lived HTTP connection. The method transmits a message processing script and the first message over the first connection to the messaging client. The message processing script enables the messaging client to display the first message and to receive and display at least one second message over the first connection (i.e., the same connection) to the messaging client. The method maintains the first connection in an open state after transmitting the first message to the messaging client. Thus, the message page and the first message both appear, from the browser's perspective, to be part of a web page that the browser is receiving over a single HTTP connection or session. The method then receives a second message to be sent to the messaging client and transmits the second message over the first connection to the messaging client for receipt by the message processing script, while continuing to maintain the first connection in an open state. In this manner, first and second messages can be sent as "messages" to the message client computer system. The method can repeat, for subsequent second messages, the steps of maintaining the first connection in an open state, receiving a second message, and transmitting the second message such that separate second messages are transmitted from the messaging server to the messaging client over the first connection. Since they are sent over the same connection, the browser receiving these messages at different times "thinks" they are data being received, for example, over a slow connection.

In another embodiment, the step of establishing a first connection to a messaging client comprises the step of opening a transport protocol session between a message handler and the messaging client. In addition, the steps of transmitting the first and second messages over the first connection to the messaging client each include the steps of encapsulating message data within a message display script and transmitting the message display script over the transport protocol session without terminating the transport protocol session such that the message processing script on messaging client (e.g., received within the initial messaging page) receives and displays the message data encapsulated within the message display script and does not close the transport protocol session (e.g., an HTTP session).

In yet another embodiment, the transport protocol session is a hypertext transport protocol session between the messaging server and the messaging client. The message processing script is included in an messaging page and defines a set of functions that a browser application operating within the messaging client can maintain for invocation by a message display script to display the message data on a display associated with the message client when the first and second message are received within the messaging client.

In a further embodiment, the message processing script and the message display script are Only-only scripts and the transport protocol session is a long-lived hypertext transport protocol session. Also, the step of establishing a first connection to a messaging client is performed in response to the step of receiving the first message to be sent to the messaging client and the message processing script included in the messaging page defines an output area in which message data encapsulated within a message display script can be displayed on a display associated with the message client. Thus, message data is encapsulated in a display script, such as JavaScript, which when received at the client browser, operates in conjunction with the message processing script (additional JavaScript) in the message page (e.g., the initial portion of the web page sent to the client just after establishing the connection) to define an output display area and to display the message data. The message display script that encapsulates the message data defines how the message data is to be displayed within the output area defined by the message processing script.

In yet another embodiment, the step of transmitting the second message over the first connection to the messaging client comprises the step of configuring the message display script to invoke functionality within the message processing script to display the message data on the display associated with the messaging client by visually replacing message data previously displayed in a former message transmitted to the messaging client.

In an additional embodiment, the message processing script and the message display script are JavaScript and the step of repeating causes the messaging server to transmit a series of second messages, each containing message data encapsulated in a message display script, to the messaging client over the first connection, such that the messaging client receives the second messages at separate times over the same first connection and such that the messaging client perceives the receipt of multiple second messages to be related to receipt of a single messaging page of data. In this manner, messages sent at different times are sent over the same connection and no special protocols are required and no messaging plug-ins or applets or executables are required to be downloaded into the client.

In another embodiment, the first connection is a long lived hypertext transport protocol session and the first and second messages are formatted only from either one or both of a hypertext markup language and/or a scripting language such as, for example, JavaScript. Also in this embodiment, the steps of transmitting the first and second messages comprise the steps of transmitting the first and second message using only a hypertext transport protocol over the long lived hypertext transport protocol session.

In a further embodiment, the first connection is a continuously open message connection and the step of maintaining the first connection in an open state comprises the steps of transmitting null data over the first connection during at least one period of time when no second messages are received for transmit over the first connection such that the messaging server and messaging client do not close the first connection. This avoids the connection from timing out if no message data is received to be sent to the messaging client. To avoid timeouts of this nature, null data or empty messages can be sent periodically to the client if a timeout period is approaching.

In yet another embodiment, the step of transmitting null data over the first connection is performed at a time interval between the transmission of the first and second messages that is less than a timeout period of a session protocol associated with the first connection thus avoiding the connection being closed inadvertently.

In another embodiment, at least one of the first message and second message are received from a call control server and include telephone status information as message data to allow a user of the messaging client to monitor at least one telephone call on a communications network. Also, the steps of receiving the first and second messages comprise the step of receiving the first and second messages from a call control server that monitors operation of phone call(s) and the message data indicates a status of the phone call(s) on a display of the messaging client. In this manner, call control messages can be received by the server and sent as messages to the client for display to the user or for other purposes.

In still another embodiment, the messaging client perceives the repeated step of transmitting the second message over the first connection to the message client to be the receipt of inbound message page data associated with the messaging page, such that time that elapses between repeated steps of receiving a second message is perceived by the messaging client to be time required to load the single messaging page. The client thus perceives each message as part of a larger web pages that is continually loading.

Other embodiment operates in a messaging client and provide methods for processing message data. One such method comprises the steps of establishing a first connection with a messaging server and receiving, over the first connection, an messaging page including a message processing script (e.g., JavaScript) that defines an output area in the messaging page and that defines functionality to enable the messaging client to display message data encapsulated within a message display script received by the messaging client. The method then receives a first message over the first connection from the messaging server. The first message includes message data encapsulated in a message display script. The method operates the message display script in conjunction with the message processing script to display first message data associated with the first message in the output area of the messaging page. The method also receives a second message over the first connection from the messaging server. The second message includes message data encapsulated in a message display script as well. The method operating the message display script of the second message in conjunction with the message processing script to display second message data associated with the second message in the output area (i.e., output display area) of the messaging page. The method repeats the steps of receiving a second message and operating the message display script of the second message such that message data in a series of second messages is received over the same first connection that remains in an open state between the message client and messaging server and is displayed to a user of the messaging client.

In another embodiment, the first connection is the only connection used to receive the first and second messages during the step of repeating. In another embodiment, the messaging page, the first and second messages, and the scripting language are comprised only of JavaScript and a markup language such as HTML.

In other embodiments, the steps of receiving the first message and receiving the second message comprise the step of operating only a hypertext transport protocol as a means to receive the first and second messages from the messaging server.

In other embodiments, the step of establishing a first connection with the messaging server comprises the steps of operating a browser to receive a request to enter an messaging session and, in response to receiving the request, establishing the first connection to the messaging server from the browser. The message processing script received in the messaging page defines functionality to define an output area within a browser and defines functionality that can be invoked by a message display script containing encapsulated message data that causes the browser to display the message data in the output area upon receipt of the message display script.

In still a further embodiment, the step of operating the message display script of the second message in conjunction with the message processing script, to display second message data associated with the second message in the output area of the messaging page, comprises the steps of retrieving the message data from the second message and operating the message display script that encapsulated the message data in conjunction with the message processing script included in the message page to display the message data in the output area of the browser in a manner that overwrites at least a portion of formerly displayed message data in the output area. In this manner, repeated receipt of second messages over the first connection causes the message display script of each second message to invoke functionality of the message processing script in the messaging page to display the message data of each respective second message in the output area of the messaging page in the browser. Thus, newer messages can overwrite older messages.

In another embodiment, the browser perceives the repeated receipt of second message to be data associated with the messaging page, such that time that elapses between repeated steps of receiving a second message is perceived by the browser to be time required to load the single messaging page.

Other embodiments of the invention include a computer system, such as a computerized device, workstation, handheld or laptop computer, client, server or other device configured with software and/or circuitry to process all of the method operations disclosed herein as embodiments of the invention. In such embodiments, the client and/or server computer system includes a display (not required, but typically present on the client), an input output interface (e.g., for receiving messages), a communications interface (e.g., a network interface), a memory (e.g., any type of computer readable medium), a processor and an interconnection mechanism connecting the display, the interface(s), the processor and the memory. In such embodiments, the memory system is encoded with a message handler application configured to perform either the client or server methods, that when performed on the processor, produces a message handler process that causes the computer system to perform any and/or all of the server or client method embodiments, steps and operations explained herein as embodiments of the invention. In other words, a computer that is programmed to operate as a client or server explained herein is considered an embodiment of the invention.

Other arrangements of embodiments of the invention that are disclosed herein include software programs to perform the method embodiment steps and operations summarized above and disclosed in detail below. As an example, a web browser software application configured to operate as explained herein to receive the message page and display messages is considered an embodiment of the invention. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within computer systems, computer program products and software applications manufactured by eDial, Inc. or Newton, Mass., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 5 illustrates an example messaging session from the perspective of a user according to one example embodiment of the invention.

DETAILED DESCRIPTION OF EMBODIMENTS

Figure 1:
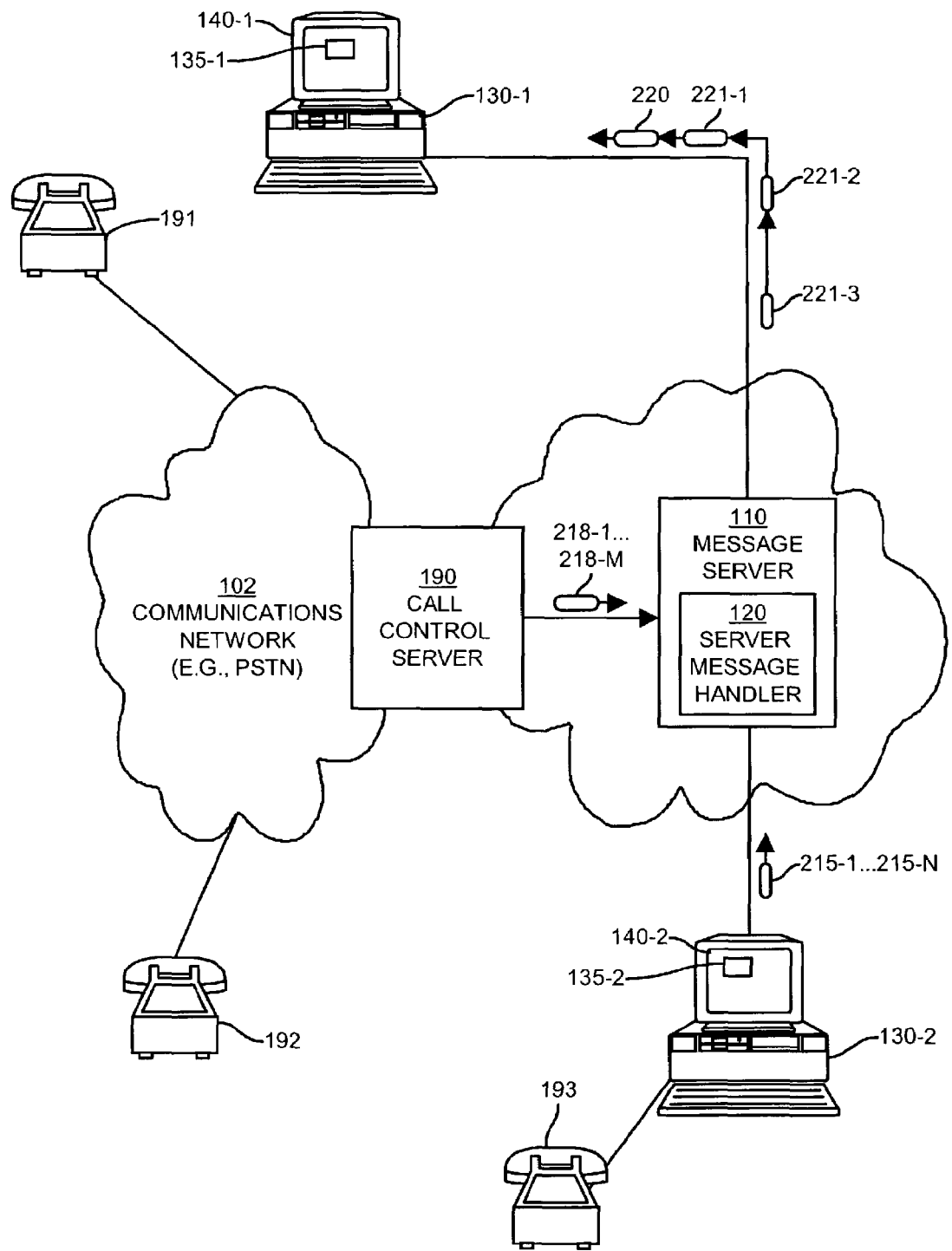
FIG. 1 illustrates an example computing system environment including a message server and messaging clients configured in accordance with embodiments of the invention.

Embodiments of the invention provide a web-based multi-party near-real-time or "instant" messaging system in which web clients can be configured to properly operate to exchange messages using HTML/HTTP and JavaScript, without requiring users of the system to download and install proprietary or customized messaging software applications or applets which operate using proprietary messaging protocols or Java. According to embodiments of the invention, no Java or ActiveX of any kind is required for implementation of the messaging system as explained herein.

Aside from messaging to exchange text messages between human users, the messaging system configured according to embodiments of the invention can be used to implement any other type of message exchange between network-based applications. One example of such an alternative arrangement allows a user to receive messages at a user console on the Internet (e.g., a user's web browser). The messages can indicate, for example, a state of a telephone call that is (or is about to) taking place on a public switched telephone network. In one such configuration, a call control server coupling the Internet and a communications network such as a telephone network can send messages to a message server that indicate the state or status of telephone calls taking place over the telephone network. Using the techniques and mechanisms described herein, the messaging server can establish a long-lived connection to the recipient messaging client such as a web browser and can continually provide call status messages over the long lived connection to the web browser. The web browser interprets each message as being an individual piece or constituent part of a single portion of data being received, such as a web page. In other words, embodiments of the invention utilize a single long lived connection to send multiple messages, separated in time and possibly sent from different sources, to a recipient web browser messaging client such that the recipient messaging client perceives the individual messages as being data related to single web page that is continually being received over the connection between the messaging client in the messaging server.

A high level overview of embodiments of the invention will be provided next followed by a more detailed description of the operation of specific embodiments presented thereafter. According to the techniques of the invention, upon detecting a requirement to begin an messaging session, a message server operating a server message handler configured according to embodiments of the invention is able to establish a long-lived messaging connection to the messaging client, such as a long-lived HTTP messaging connection. Once the HTTP messaging session is established between the message handler operating in the messaging server and an messaging client such as a web browser operating in the client computer system, the message handler transmits or otherwise forwards an messaging page over the long-lived HTTP connection to the messaging client (i.e., to the web browser). The messaging page includes a message processing script that enables the messaging client to receive and display messages on a display associated with the client computer system. In one embodiment of the invention, the message processing script is a set of JavaScript functions or logic which can be called or invoked as required (and as will be explained herein) to display message data encapsulated within a message display script received from messages sent to the messaging client from the messaging server. All communication during the messaging session for all messages takes place over the single long-lived HTTP connection thus eliminating the requirement of implementing proprietary messaging protocols.

When the messaging server transmits the messaging page including the message processing script (i.e., a set of JavaScript functions) to the messaging client browser operating in the client computer system, the messaging client and messaging server do not break or disrupt or close the long-lived HTTP connection. In other words, the long-lived connection is not closed upon receipt of the messaging page containing the message processing script. Instead, once the content of the messaging page including the message processing script is loaded into the browser over the HTTP connection, the client is unaware that the page has been fully loaded and is thus expecting more data. At this point, the messaging server then awaits receipt of information in the form of a first message to be transmitted to the messaging client. Upon receipt of a message (i.e., detection of message data) to be sent to the messaging client, the messaging server encapsulates the message data into a message display script and transfers this as a first message (i.e., message data encapsulated within the message display script) to the messaging client. The message display script enables the messaging page to display the message data by invocation of functions within the message processing script within the messaging page. During operation of embodiments of the invention, the initial messaging page includes JavaScript message processing functions that can create an output display area for display of message data that is encapsulated within the message display script received from the message server. The message display script, that encapsulates the message data, is thus detected by the message processing script in the web page. Since the long-lived connection is never closed upon receipt of the message page and each message, the messaging client perceives all subsequently received messages, each containing message data encapsulated within a message display script, to be a part of the data associated with original messaging page.

The message processing script logic built into the messaging page can cause the message data within each message to overwrite previously received message data within the output area of a display associated with the messaging client. In other words, an messaging window can be created on the display such as a web browser of the messaging client upon receipt and rendering of the messaging page of the web browser. Thereafter, the long-lived HTTP connection is maintained in an open state and the message server from time to time will send messages containing message data encapsulated within the message display script. Upon receipt by the messaging client, the message display script invokes functionality associated with the message processing script in order to display the message data within the output area of the messaging window. This can overwrite any formerly displayed message data. In the event of long periods of time between messages, the messaging server can transmit no data or a blank or empty message to the messaging client in order to avoid timeout situations associated with the long-lived connection. This avoids messaging client from closing the connection due to lack of receipt of data over the connection for extended period of time.

FIG. 1 illustrates a computing system environment 100 suitable for use in explaining example operations of embodiments of the invention. The computing system environment 100 includes a computer network 101 such as the Internet coupled by a call control server 190 to a communications network 102 that may be, for example, a public switched telephone network (PSTN). The communications network 101 interconnects a plurality of telephone units 191 and 192 and operates as a traditional telephone network. Within the computer network 101, a message server computer system 110 operates a server message handler 120 configured according to one embodiment of the invention. A plurality of messaging client computer systems 130-1 and 130-2 are coupled to the computer network 101 and are in communication with the message server computer system 110, as will be explained. In this example, each messaging client computer system 130 includes a display 140. Each messaging client computer system 130 operates a client message handler 145 such as a web browser upon or within which (i.e., upon the display 140) is rendered an output area 135 within which messaging data or information can be displayed for a user of the messaging client computer systems 130. Also in this example networking environment 100, a telephone unit 193 is coupled to the messaging client computer system 130-2 and allows a user of the messaging client computer system 130-2 to place telephone calls (e.g., Voice Over Internet Protocol or VOIP calls) over the computer network 101 to other telephone units coupled either to other messaging client computer systems 130 or, through the call control server 190, to telephone units 191 and 192 on the communications network 102.

In this example, the server message handler 120 operates within the message server computer system 110 to receive messages 215-1 through 215-N (received in this example from the messaging client computer system 130-2) and 218-1 through 218-M (received in this example from the call control server 190). Using the techniques explained herein, the server message handler 120 is able to receive these messages 215 and 218 (i.e., message data, signaling information, etc.) and is able to provide this message data in a series of messages 221-1 through 221-W to the client message handler 145-1 operating within the messaging client computer system 130-1. In this example, the messages 215 received by the server message handler 120 from the messaging client 130-2 may be, for example, text messages, application data, or other message data that a user of the messaging client 130-2 desires to transmit instantly (i.e., as soon as possible) to a user viewing the display 140-1 of the messaging client 130-1. Also in this example, the messages 218 received by the server message handler 120 from the call control server 190 may be, for example, call control status messages of signaling data indicating the status or call state of one or more telephone calls or other communications sessions (e.g., person to person calls or conference calls) taking place between telephone units 191 through 193 over the communications network 102 and/or the computer network 101. The actual content of the message data in the messages 218 and 215 is not meant to be limiting to embodiments of this invention.

Generally, upon receipt of a message 215 or 218 to be sent to the messaging client 130-1, the message server 110 operating the server message handler 120 (e.g., as a process) establishes a connection such as an HTTP connection to the client message handler application 145-1 (e.g., the web browser) operating within the messaging client 130-1. This HTTP connection, designated as connection 210 in FIG. 1, is a long-lived HTTP session that operates between the server message handler 120, which may include web server functionality, and the client message handler 145, in order to receive all messages 221 during the life of the messaging session. In other words, once the connection 210 is established from the server message handler 120 to the client message handler 145-1 in the messaging client 130-1, all messages 221 transferred from the server 120 to the client 130-1 are transferred over the connection 210, even though the message data streams 215 and 218 are received at different times and from different sources by the server message handler 120. Generally, to accomplish this, upon opening the connection 210, the server message handler 120 transfers an messaging page 220 to the messaging client 130-1 and leaves the connection 210 in an open state.

The messaging page 220 includes message processing logic (not specifically shown in this figure) which in one example embodiment is JavaScript that equips or enables a client message handler 145-1 to display forthcoming message data received in a series of messages 221-1 through 221-N. Each message 221 comprises message data (not specifically shown) from the messages 215 and 218 that is encapsulated by message display script logic (i.e., additional JavaScript not specifically shown in this figure) that is capable of invoking the message processing logic contained within the messaging page 220 in order to display the message data contained within each message 221. More specifically, as generally provided by embodiments of the invention, the messaging page 220 that the server 120 initially transfers over the connection 210 to the client message handler 145 includes message processing JavaScript logic (message processing script(s)) that gets retained in the web page 220 by the browser 145 and that can be subsequently invoked by message display JavaScript logic (display processing script(s)) that is included in each message 221 in order to encapsulate message data from the message 215, 218. Accordingly, a client message handler 145 such as a web browser operating within the messaging client 130-1 can receive the messaging page 220 that contains embedded message processing JavaScript logic that provides (i.e., that renders) the output display area 135-1 (e.g., a frame or window) within which messages 221 that are received in the future (i.e., at a latter time over the connection 210) are displayed.

Thereafter, after time elapses, the server message handler 120 can receive one or more messages 215 and/or 218 at various times (e.g., randomly). The server message handler 120 can encapsulate the message data of each message 215 and 218 with a respective message display script (i.e., within a JavaScript wrapper) each time the server message handler 120 receives a message 215 or 218. The server message handler 120 can then transfer each separately encapsulated message as a respective message 221 over the connection 210, which remains open for the entire duration of this processing, for receipt by the web browser client message handler 145-1 operating within the messaging client 130-1. It is to be understood that the messages 215 and 218 are illustrated in this example as originating from outside of the message server 110. This need not be the case. In an alternative arrangement, the server message handler 120 can receive a message 215 or 218 from another process within the message server computer system 110 (i.e., such messages 215 and/or 218 containing message data to be sent as an message 221 do not have to originate over a network).

Within the client message handler 145-1, the message display script logic in each message 221 (that encapsulates the message data) is capable of invoking the message processing script logic previously provided to the client message handler 145-1 within the messaging page 220. The message display logic (in each message 121) causes the message processing logic (in the messaging page 220) to extract the message data from the message 221 for display within the output area 135 on the display 140 of the messaging client 130-1. In order to avoid the disconnection or closing of the connection 210, the client and server message handlers 145 and 120 do not close the connection 210 after transfer of the messaging page 220, nor after transfer of each message 221 over the connection 210. Instead, embodiments of the invention treat each message 221 as part of the messaging page 220. In other words, the client message handler 145-1 within the messaging client 130-1 perceives receipt of the messages 121 as being data that is part of the message page 220, much the same way as a typical conventional web browser retrieves content of a web page one unit at a time such as graphic by graphic, figure by figure, text portion by text portion and so forth.

Accordingly, when the client message handler 145-1 receives the messaging page 220, any time that elapses after receipt of the messaging page 220 but before receipt of the first message 221-1 is considered (i.e., by connection management software within the web browser 145) to be experienced (i.e., to be required) due to a delay in data transmission over the connection 210. As an example, an extremely large web page may take 20 seconds or several minutes to fully download over a relatively slow data communications connection. Accordingly, since the messaging page 220 is a combination of JavaScript and HTML, this page 220 does not include an "end HTML" tag (e.g., </HTML>). The client message handler 145-1 (i.e., the web browser) is thus "fooled" into thinking that more web page data is on its way from the server message handler 120. The web browser 145-1 thus waits and operates to continually keep the connection 210 in open state in order to receive any remaining portions of the messaging page 220 that are forthcoming, such remaining portions being the messages 221. This waiting period can be several seconds, minutes, hours or an indefinite amount of time. As messages or message data 215 and 218 arrive (or otherwise becoming available) at the server message handler 120, the server message handler 120 encapsulates the message data using message display script logic and forwards this information in a series of one or more packets (i.e., as an message) to the continually awaiting client message handler 145 (i.e., to the web browser) that is awaiting completion of receipt of the messaging page 220.

If the server message handler 120 does not receive any messages 215 or 218 before a period of time equal to a timeout period of the connection 210 (or a timeout governed by the client message handler web browser 145-1), then the server message handler 120 can send a "Null Data" or blank message 221 to the client message handler 145-1 to avoid web browser connection timeouts.

Figure 2:
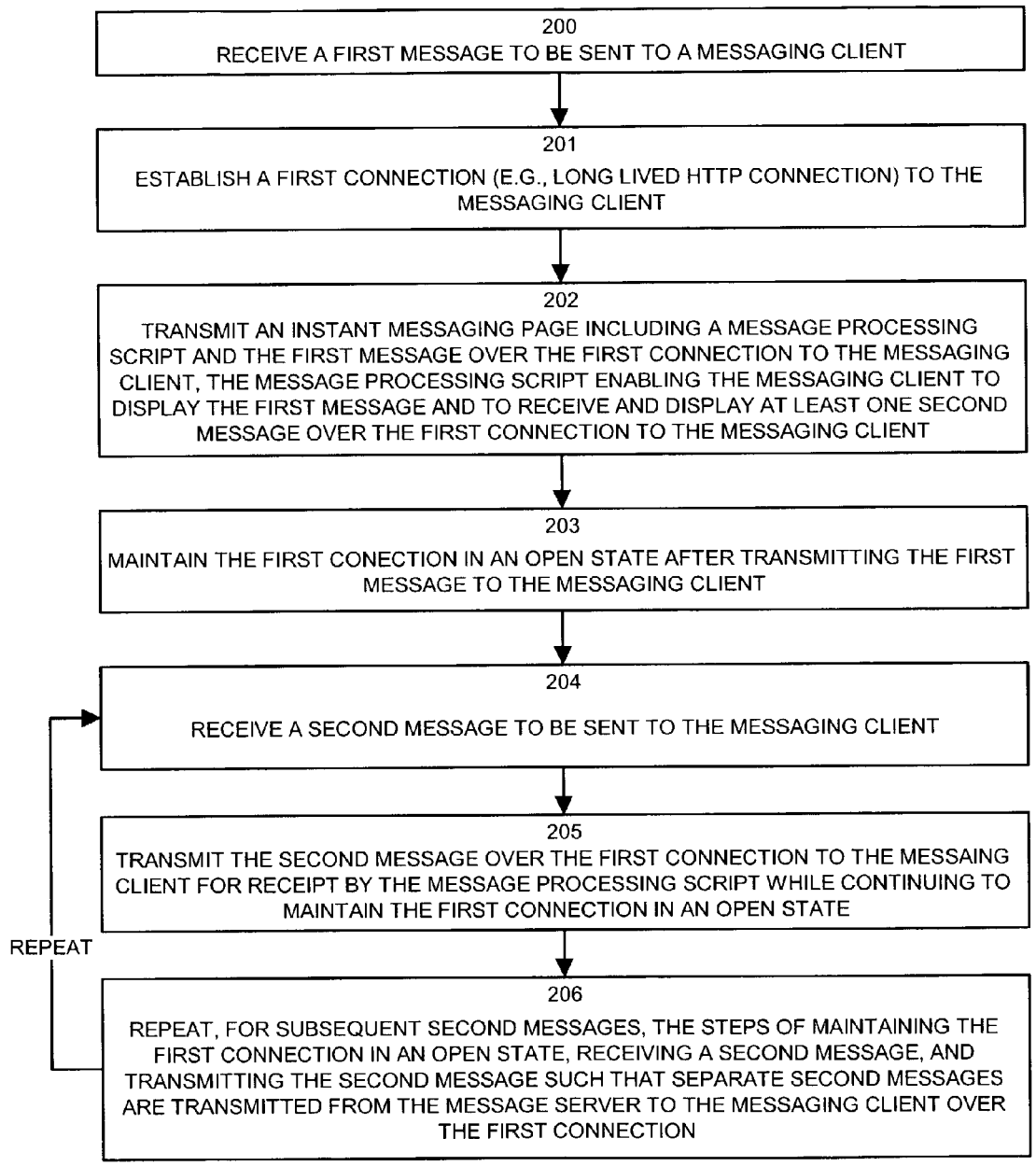
FIG. 2 is a flow chart of processing steps that can be performed by a message server configured according to one embodiment of the invention.

FIG. 2 is a flow chart of processing steps performed by a server message handler 120 configured according to one example embodiment of the invention to provide messaging capability to the messaging client such as that explained above with respect to FIG. 1.

In step 200, the server message handler 120 receives a first message to be sent to a messaging client 130. The first message may be, for example, one of the messages 215 or 218 shown in FIG. 1, or may be data or other information.

In step 201, the server message handler 120 establishes a first connection 210 such as a long-lived HTTP connection to the messaging client 130-1 (i.e., to the client message Handler 145-1 which may be a web browser).

In step 202, the server message handler 120 transmits the messaging page 220 including a message processing script over the first connection 210 to the messaging client 130-1. In addition, the server message handler in this step also transmits the first message as an message 221 over the first connection 210 to the messaging client 130-1. The message processing script enables the messaging client 130-1 (i.e., the client message handler 145-1) to display the first message 121 (i.e., message data contained therein) and to receiving display at least one second message over the first connection 210 to the messaging client 130-1. In other words, in step 202, the server message handler 120 transmits the messaging page 220 to the web browser 145 operating in the client computer 130. In addition, a first message 121-1 is transferred to the web browser 145 for display within the output area 135. The message processing script within the messaging page enables a series of messages to be received over the same connection 210 and displayed within the output display area 135.

In step 203, the server message handler 120 maintains the first connection 210 in an open state after transmitting the first message 121-1 to the messaging client 130-1. That is, after receiving the messaging page 220 and the first message 121-1, the connection 210 is not closed or otherwise disrupted.

Next, in step 204, the server message handler 120 receives a second message to be sent to the messaging client 130-1. As an example with respect to FIG. 1, the server message Handler 120 may receive another message in a series of messages 215 or 218.

In step 205, the server message handler 120 transmits the second message as an message 221-2 over the first connection 210 to messaging client 130-1 (i.e., to the client message handler web browser 145-1) for receipt by the message processing script (i.e., which was formerly received by the client within the messaging page 220) while continuing to maintain the first connection 210 in open state. In other words, in step 205, after receipt of another message by the server message handler 120, the server message handler 120 encapsulates message data in a message processing script to form another message 221-2 (or the next in a sequence) and then transmits this second additional message 221 over the same continually open long-lived HTTP connection 210. The message processing script logic contained within the messaging page 220 is activated (within the client web browser 145) upon receipt of this second message 221 thus allowing display of the message data within the output area 135-1 to the web browser 145-1 in the messaging client 130-1.

In step 206, processing is directed to back to step 204 such that the server message handler 120 repeats, for subsequent second messages 215 and 218, the steps of maintaining the first connection in open state and receiving a second message and transmitting the second message such that separate second messages 221-3, 221-4, . . . 222-N are transmitted from the message server handler 120 to the messaging client 130-1 over the same first connection 210. That is, in step 206, the processing of receiving messages and transferring the messages as messages 221 (i.e., encapsulated within message display logic scripts) to the recipient client message handler 145 continues indefinitely. In this manner, a single long-lived HTTP connection 210 can be used to perform messaging to a recipient messaging client computer system 130 without the requirement for downloading specialized Java applets or utilizing proprietary messaging protocols. Instead, a single HTTP connection is used to transmit an messaging page 220 comprising only JavaScript and HTML in order to configure the browser on a recipient messaging client 130 with the ability to receive messages 221 containing JavaScript that can invoke the message processing logic initially received in the messaging page 220 to display the message data within the output area 135. The messaging client computer systems 130 are not required to be equipped with a Java virtual machine nor are there any Java applets or other customized messaging applications required to be downloaded an installed by the user of the messaging client computer system 130.

Figure 3:
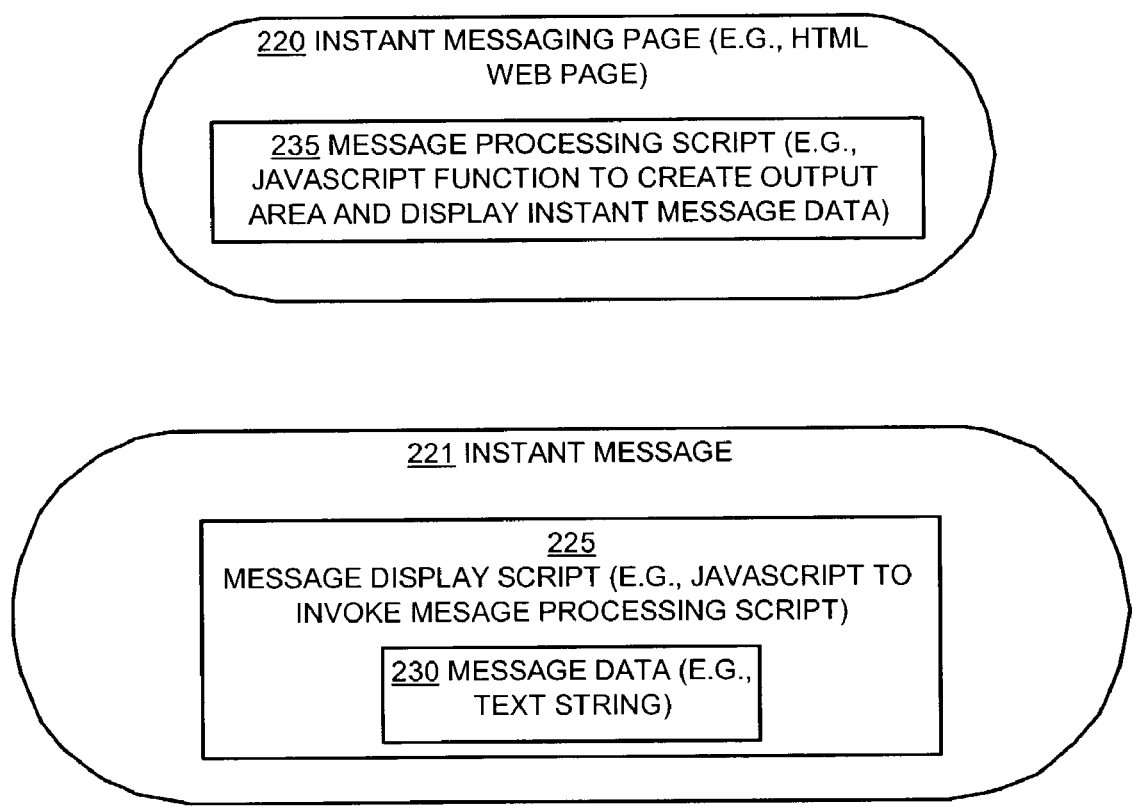
FIG. 3 illustrates data structures including an messaging page and an message configured in accordance with embodiments of the invention.

FIG. 3 illustrates an example architecture of the messaging page 220 and an example message 221. As illustrated, the messaging page 220 is an HTML formatted web page containing embedded message processing script logic 235 that in this example is JavaScript logic. Generally, the message processing script 235 enables the messaging client web browser 145 to define an output area 135 for display of the contents of messages 221. The message 221 includes a message display script 225 which in this example is JavaScript to invoke functionality of the message processing script 235 within the messaging page 220 once the message 221 is received by the client message handler web browser 145. The message display script 225 thus encapsulates the message data 230.

Provided below is an example of message processing logic in the form of JavaScript source code configured according to one example embodiment of the invention. This message processing logic is embedded within the messaging page 220 and allows the web browser to define an output area 135 for the display of the message data contents of an message 221. The example message processing script appears in this example as follows:

```
function updateInfo(userid, newPresence, myNewPhone, isNew, buddyNum, buddyAlias, buddyPhone) {
    if ((newPresence == null && myNewPhone == null) || (newPresence != null && userid == null))
        return;
    updateInProgress = 1;
    var myPhone = buddyCon.document.consoleFrm.myPhone;
    var myPresence = buddyCon.document.consoleFrm.myPresence;
    if (myNewPhone != null)
    {
```

```
                if (isSendingNewPhone) // Don't let server set phone number while client is
trying to change it.
                {
                        updateInProgress = 0;
                        return;
                }
        var validNewPhone = makeValidNumber(myNewPhone);
                if (validNewPhone == null) // Server is setting my phone number to something
invalid!
                {
                        updateInProgress = 0;
                        return;
                }
                var newPhoneIndex = getMenuIndex(myPhone, validNewPhone);
                var prevPhone = myPhone.options[myPhone.selectedIndex].value;
                if (prevPhone.toLowerCase( ) != validNewPhone.toLowerCase( ))
                {
                        addPhoneToList(myNewPhone, FROM_SERVER);
                        addToCookie("ed_currentphone_"+ usernameEsc, myNewPhone, null,
NEXT_YEAR, COOKIE_REPLACE);
                        if (prevPhone && prevPhone.toLowerCase( ) != "new" && gotFirstMessage &&
!phoneinitInProgress) // Don't alert when initaly populating menu.
                                alert("Your phone number has been changed to " + validNewPhone);
                }
                _prevPhone = myNewPhone; // Set global phone number
                _prevPhoneIndex = myPhone.selectedIndex;
}
if (gotFirstMessage && buddiesLoading)
{
        buddyCon.document.getElementById("buddyTbl").deleteRow(0);
        buddiesLoading = 0;
}
if (newPresence != null)
        if (userid.toLowerCase( ) == myUsername.toLowerCase( )) // Presence update for
me
                {
                        var newPresenceIndex = getMenuIndex(myPresence, newPresence);
                        if (newPresenceIndex >= 0)
                                myPresence.selectedIndex = newPresenceIndex;
                        else
                                addElement(myPresence, newPresence, newPresence);
                        _presence = newPresence; // Set global presence
                        _prevPresIndex = myPresence.selectedIndex;
                }
                else // Presence update for a buddy
                {
                        var buddies = (document.cookie ? getCookie("ed_buddies_" + usernameEsc):
"");
                        if (allBuddies[userid] == null) // First presence update for a buddy
                                if (isNew || (buddies && buddies.indexOf(userid.toLowerCase( )) >= 0))
                                {
                                        if (isNew) // Completely new buddy
                                        {
                                                if (!buddyPhone)
                                                        buddyPhone ="";
                                                addBuddyToCookie(userid, buddyAlias, buddyPhone);
                                        }
                                        else
                                        {
                                                var buddyInfoStr = userid + boundSearch(buddies, userid, ";"); //
Get buddy info from cookie
                                                var buddyInfoArr = new Array( );
                                                        buddyInfoArr = buddyInfoStr.split("~");
                                                buddyAlias = buddyInfoArr[1];
                                                buddyPhone = (buddyInfoArr[2] ? buddyInfoArr[2] : "");
                                        }
                                        allBuddies[userid] = new Buddy(userid, "", buddyNum, buddyAlias,
buddyPhone);
                                        if (buddyNum > highestBuddyNum)
                                                highestBuddyNum = buddyNum;
                                        insertBuddy(allBuddies[userid]);
                                }
                                else // Got presence update for buddy I don't have
                                {
                                        updateInProgress = 0;
                                        return;
                                }
                        presenceText = eval("buddyCon.document.getElementById('presence" +
allBuddies[userid].buddyNum + "')");
```

```
                if (!presenceText)
                {
                        alert("There is a problem with the buddy display in your Buddy Console
window.\n" +
                                "If you choose Sign Out and log in again, your window should
then be usable.");
                        return;
                }
                var displayedPresence = (presenceDisplay[newPresence.toLowerCase( )] ?
presenceDisplay[newPresence.toLowerCase( )] : newPresence);
                var buddyAlias = allBuddies[userid].alias;
                if (newPresence.toLowerCase( ).indexOf("online") < 0)
                        presenceText.innerText = buddyAlias +" ("+ displayedPresence + ")";
                else
                        presenceText.innerText = buddyAlias;
                var isOnline = (newPresence.toLowerCase( ).indexOf("offline") < 0);
                presenceText.style.color = (isOnline ? "#000000": "#666666");
                imImage = eval("buddyCon.document.getElementById('im" +
allBuddies[userid].buddyNum + "')");
                imImage.src = (isOnline ? mediaDir + "/im.gif" : mediaDir + "/im-red.gif");
                imImage.alt = (isOnline ? "Click to send IM to" + buddyAlias : buddyAlias + " is
offline (cannot send IM)");
                linkChange(imImage, (isOnline ? "javascript:parent.buddyRecv.startIM('" +
userid + "')" : ""), 2);
                var isOffPhone = (newPresence.toLowerCase( ).indexOf("onthephone") < 0);
                phoneImage = eval("buddyCon.document.getElementById('phone" +
allBuddies[userid].buddyNum +"')");
                phoneImage.src = (isOffPhone ? mediaDir +"/phone.gif" : mediaDir + "/phone-
red.gif");
                phoneImage.alt = (isOffPhone ? "Click to eDial " + buddyAlias : buddyAlias +"
is on the phone (cannot eDial buddy)");
                linkChange(phoneImage, (isOffPhone ?
"javascript:parent.buddyRecv.startCall('" + userid + "')" : ""), 2);
        }
        updateInProgress = 0;
}
function addPhoneToList(newPhone, origin) { // Add phone number to menu and cookie
        if (newPhone == null || newPhone.length == 0)
                return;
        if (origin == null || (origin != FROM_CLIENT && origin != FROM_SERVER))
                origin = FROM_CLIENT;
        var myPhone = buddyCon.document.consoleFrm.myPhone;
        var newPhoneComplete = (!beginPlus.test(newPhone) ?
makeValidNumber(newPhone) : newPhone);
        if (newPhoneComplete != null) // Phone number is in a valid format
        {
                var newPhoneIndex = getMenuIndex(myPhone, newPhoneComplete);
                if (newPhoneIndex < 0)
                {
                        addElement(myPhone, newPhoneComplete, newPhoneComplete);
                        addToCookie("ed_phones_"+ usernameEsc, newPhoneComplete, null,
NEXT_YEAR, COOKIE_ADD);
                }
                else
                        myPhone.selectedIndex = newPhoneIndex;
                // If server sent understandable but invalid phone no. (e.g. local number without
"+1"), correct it.
                if (origin == FROM_SERVER && newPhone.toLowerCase( ) !=
newPhoneComplete.toLowerCase( ))
                        performAction('action', 'do_update_phone', 'prevPhone', newPhone,
'newPhone', newPhoneComplete, 'presence', _presence);
        }
        else
        {
                if (origin == FROM_CLIENT)
                        alert(invalidPhoneMsg);
                else
                        alert("The eDial server does not have a valid phone number set for you.
Please enter one.");
                myPhone.selectedIndex = myPhone.options.length - 1;
                window.setTimeout("checkPhone( )", 100);
        }
}
function addIM(callID, thisIM, msgNum) {
        if (!callID)
                return null;
        if (parseInt(getCookie("ed_ignore_im_" + usernameEsc)))
                return -1;
        if (msgNum)
```

-continued

```
            thisIM.msgNum = msgNum;
        var thisIMWindow;
        if ((thisIMWindow = getWindowHandler(callID)) != null && !thisIMWindow.win.closed)
            if (thisIMWindow.win && thisIMWindow.win.loaded)
                displayIM(thisIMWindow.win, thisIM);
            else
                initQueueAppend(thisIMWindow, thisIM);
        else
            openIMWindow(EXISTING_IM, thisIM, callID);
}
function displayIM(thisIMWindow, thisIM) {
        var IMDataForm = thisIMWindow.document.IMDataForm;
        while(thisIM.msg.indexOf("\n") >= 0)
                thisIM.msg = thisIM.msg.replace("\n", "<br>");
        var displayColor = (thisIM.senderId != null ?
                (thisIM.origin == WAS_RECEIVED ? IMRecvColor : IMSendColor) : msgColor);
        var IMDataBox = thisIMWindow.document.IMDataBox;
                IMDataBox.document.write("<span style=\"color:" + displayColor +
                                "; font-weight:bold\">");
        if (thisIM.senderId != null)
        {
                if (thisIM.origin == WAS_RECEIVED)
                {
                        if (!thisIMWindow.recipHasFocus)
                        {
                                var IMrecipsArr    = new Array( );
                                var oldIMrecipsArr = thisIM.recips.split(/[,;]/);
                                for (var testRecipNum = 0; testRecipNum < oldIMrecipsArr.length;
testRecipNum++)
                                        if (oldIMrecipsArr[testRecipNum].toLowerCase( ) !=
myUsername.toLowerCase( ))
                                                IMrecipsArr.push(oldIMrecipsArr[testRecipNum]); // In effect,
exclude me from recip list
                                IMrecipsArr[IMrecipsArr.length] = thisIM.senderId; // For received IMs,
add sender to recipient list
                                IMrecipsStr = IMrecipsArr.join(",");
                                var currentRecipsArr = IMDataForm.recips.value.split(/[,;]/);
                                if (!arrCmp(currentRecipsArr, IMrecipsArr))
                                        IMDataForm.recips.value = IMrecipsStr; // Update user list in IM
window.
                        }
                        // Alert sound sometimes causes JavaScript error; look into this later.
                        // if (thisIM.origin == WAS_RECEIVED && document.alertSound &&
document.alertSound.readyState == "complete")
                        //     document.alertSound.play( )
                        thisIMWindow.lastMsgNum = thisIM.msgNum;
                }
                IMDataBox.document.write(thisIM.senderAlias + ":</span>\n"+ thisIM. msg +
"<br>\n\n");
        }
        else
        {
                if (thisIM.recips != null)
                        thisIM.msg += "<br>\n\" + thisIM.recips +" has been removed from this
session.";
                IMDataBox.document.write(thisIM.msg +"</span><br>\n\n");
                if (thisIM.recips != null)
                {
                        // Remove error that produced error (Not Found or Temporarily Unavailable)
from IM recipient list.
                        var errorRecip   = thisIM.recips; // Buddy server sets IM recipient to error-
producing username.
                        var currentRecips = IMDataForm.recips.value;
                        var oldIMrecipsArr = currentRecips.split(/[,;]/);
                        var IMrecipsArr    = new Array( );
                        for (var testRecipNum = 0; testRecipNum < oldIMrecipsArr.length;
testRecipNum++)
                                if (oldIMrecipsArr[testRecipNum].toLowerCase( ) !=
errorRecip.toLowerCase( ))
                                        IMrecipsArr.push(oldIMrecipsArr[testRecipNum]);
                        var IMrecipsStr = IMrecipsArr.join(",");
                        IMDataForm.recips.value = IMrecipsStr; // Update user list in IM window.
                }
        }
        IMDataBox.scrollBy(0, IMDataBox.document.body.clientHeight ?
                IMDataBox.document.body.clientHeight : IMDataBox.innerHeight);
}
```

Example 1

Message Processing Script

As illustrated in the above example JavaScript computer programming language source code, this set of programming script code functions can be embedded within the HTML of a messaging page 220 that is initially transferred from the server message handler 120 to a client message handler 145 upon initiation of the messaging section. This message programming script configures the client message handler 145 (i.e., resides within the web browser) to be able to display (i.e., when called upon to do so) message data contained within messages 221 once such messages 221 are received by the client message handler 145-1. The messaging page 220 essentially pre-configures the web browser 145 with the ability to display message data upon detection and receipt of messages 221 whenever they should arrive over the connection 210. The browser 145 and server 120 continually maintain the connection 210 in open state in a manner such that the web browser 145 perceives the messages 221 to be small portions of, or streams, of data that are part of the messaging page 220, even though such messages 221 may be received at a much later time at the browser 145 than the messaging page 220 containing the above JavaScript.

Provided below is an example of message display logic (e.g., a pseudocode JavaScript structure in this example) configured according to one example embodiment of the invention that illustrates how the server message handler 120 can encapsulate message data (referred to an "thisIM.msg" in this example) for transfer as an message 221 to the client message handler 145 for use by a message processing script such as that shown above (or something similar in functionality and/or operation). The example pseudocode JavaScript message, containing message data in the field "thisIM.msg" is as follows:

thisIM { // beginning of message data structure
thisIM.origin="messaging client 130-2" // identifies a source of the message data
thisIM.sender="server message handler 120" // identifies which message server is sending data
thisIM.msg="This is the text of an message sent to a client for display" // message data
} // end of message data structure

Example 2

Message Display Script

As illustrated in the above example, the first field of the message display script is labeled "thisIM" and defines a data structure containing three fields: "thisIM.origin", "thisIM.sender", and "thisIM.msg." The "thisIM.origin" field indicates the original source of the message data such as a messaging client or call control server 190 as illustrated in FIG. 1, which in this example is the messaging client 130-2. The second field "thisIM.sender" indicates which message server is sending message data contained within this message 221, which in this example is the server message handler 120 from FIG. 1. Finally, in this example configuration, the third field "thisIM.msg" indicates the actual message data transferred within the message 221, which in this example is the string "This is the text of an message sent to a client for display." Those skilled in the art will understand that this message display script encapsulates the message data and can be utilized by the aforementioned example of message processing script logic (i.e., the displayIM function) in order to display the string "This is the text of an message sent to a client for display" within the output display area 135 on the display 140 of the messaging client 130.

Figure 4:
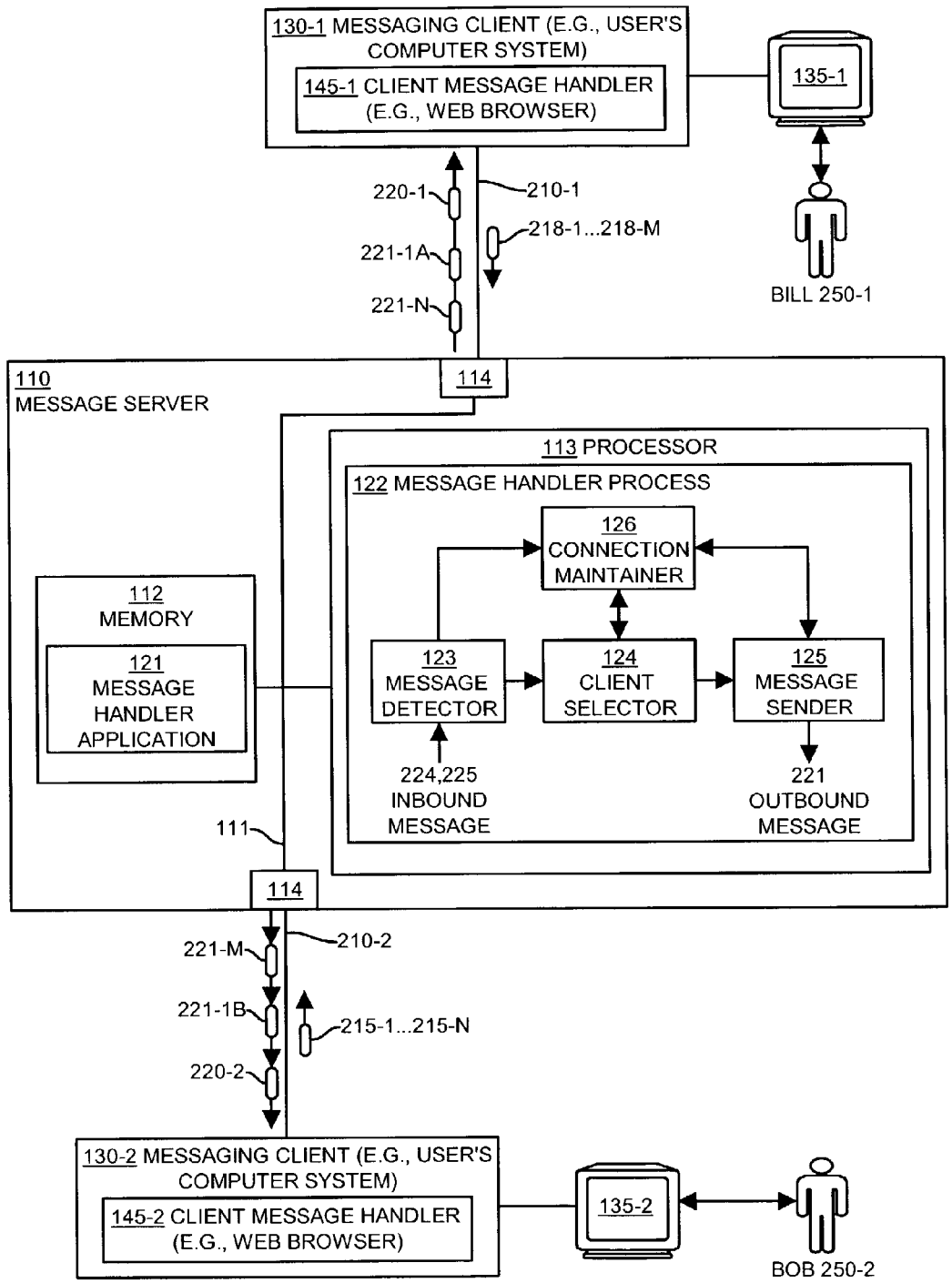
FIG. 4 illustrates an example architecture of a message server and interoperation with messaging clients according to one example embodiment of the invention.

FIG. 4 illustrates an example architecture of a message server computer system 110 configured according to one embodiment of the invention. In addition, FIG. 4 illustrates how the message server 110 configured according to embodiments of the invention can provide messaging capabilities between two messaging client computer systems 130-1 and 130-2. Each messaging client computer system 130-1 and 130-2 includes a respective output display area 135-1 and 135-2 and operates a respective client message handler 145-1 and 145-2, which are web browsers in this example. In this example, human users named "BILL" 250-1 and "BOB" 250-2 are performing text messaging between each other using the mechanisms and techniques provided by embodiments of the invention.

The message server computer system 110 includes, in this example embodiment of the invention, an interconnection mechanism 111 such as a data bus and/or other circuitry that interconnects a memory 112, a processor 113 and one or more communications interfaces 114. The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions (e.g., software code) and/or data that form a message handler application 121 configured according to embodiments of the invention. In other words, the message handler application 121 represents software code, instructions and/or data that represent or convey the processing logic steps and operations as explained herein and that reside within memory or storage or within any computer readable medium accessible to the message server computer system 110.

The processor 113 represents any type of circuitry or processing device such as a central processing unit, microprocessor or application-specific integrated circuit that can access the message handler application 121 encoded within the memory 112 over the interconnection mechanism 111 in order to execute, run, interpret, operate or otherwise perform the message handler application 121 logic instructions. Doing so forms a message handler process 122. In other words, the message handler process 122 represents one or more portions of the logic instructions of the message handler application 121 while being executed or otherwise performed on, by, or in the processor 113 within the message server computer system 20.

The message handler process 122 that operates in the message server 110 in this example generally includes a message detector 123 for detecting message 215 or 218 to be sent over a long-lived connection 210-1, 210-2 (i.e., as messages 221) to a message client 130-1, 130-2, a client selector 124 for making determinations about selecting which messaging client 130 a message 215 is to be sent as an message 221, a connection maintainer 126 for maintaining open and active connections 210 (e.g., by sending periodic empty or null data messages 221 to avoid connection timeouts), and a message sender 125 which handles encapsulating message data received from messages 215, 218 using a message display script 225 for transmission as an message 221 to a messaging client 130 over a long-lived connection 210. Generally, the message handler process 122 is configured to operate according to the techniques explained herein. It is to be understood that the server message handler 120 illustrated in FIG. 1 is represented in FIG. 4 by a combination of the message handler application 121 and/or the message handler process 122.

In the example illustrated in FIG. 4, the message handler process 122 maintains two long-lived HTTP connections 210-1 and 210-2 to respective messaging clients 130-1 and 130-2. Over each of these connections 210 from the message server 110 to each respective messaging client 130, the message server handler process 122 transmits a respective messaging page 220-1, 220-2 followed by a series of one or more messages 221-A through 221-N (from the message server 110 to the messaging client 130-1) and 221-1B through 221-M (from the messaging server 110 to the messaging client 130-2).

Also illustrated in this figure are a series of messages 218-1 through 218-N and 215-1 through 215-M sent from the messaging clients 130-1 and 130-2 to the messaging server 110. The message streams 218 and 215 represent data, text or other information sent, for example, by a user of the client message handler 145 as a message to the message server 110 for transmission as an message 221 to the recipient messaging client 130. As an example, the messages 215 can each be transmitted from the messaging client 130-2 over separate HTTP connections (i.e., as separate messages over separate connections) to the messaging server 110 which converts these messages 215 into messages 221-1A through 221-N for transfer over the single long-lived connection 210-1. Likewise, the messaging client 130-1 can transmit the messages 218-1 through 218-M to the message server 110 at which point the message handler process 122 converts these messages 218 into respective messages 221-1B through 221-M which are sent to the messaging client 130-2 over the connection 210-2 according to the techniques explained herein (i.e., over a single long-lived connection).

FIG. 5 illustrates an example of an messaging session as seen by the user named "BILL" 250-1 (see FIG. 4) within the output display area 135-1. In this example, the output display area 135-1 displays text of messages sent and received between BOB and BILL from the perspective of this messaging client 130-1. An input display area 136 provides a location for the user BILL 250-1 to enter outbound messages (i.e., messages 218 to send to the other messaging client) to be sent to BOB 250-2.

Within the output display area 135-1, the actual text messages are shown as quoted character strings prefaced with either the phrase "INBOUND" or "OUTBOUND" and a message number such as M1, M2, M3 . . . etc that indicates the order of the message either sent of received. As an example, outbound message M1 is the first message 218-1 (FIG. 4) sent from this messaging client 130-1 to the message server 110, whereas inbound message M1 is the first message 221-1 received by the messaging client 130-1 (i.e., according to the techniques of this invention). This example illustrates how two-way or full duplex messaging communication between two messaging clients 130-1 and 130-2 can take place from the perspective of one user BILL 250-1.

As illustrated in the output display area 135-1 in FIG. 4, upon establishment of the messaging session (i.e., establishing a long-lived connection 210-1 between the message server 110 and the messaging client 130-1 and transmitting the messaging page 220-1 to this client) a first inbound message 221-1A (FIG. 4) arrives at the messaging client 130-1. The message 221-1A includes a message display script 225 (FIG. 3) that operates in conjunction with the messaging processing script 235 (loaded beforehand during receipt of the messaging page 220) and causes the client message handler 145-1 to display the message "INBOUND M1: HI BILL, ARE YOU THERE, THIS IS BOB?" within the output area 135-1. The user BILL 250-1 sees this message and answers by entering a reply text string into the outbound message area 136 that reads "YES BOB, THIS IS BILL, WHAT'S UP?" The client message handler 145-1 returns this response string as a reply message 218-1 to the message server 110 using and HTTP response. In addition, the client message handler 145-1 displays text of this first outbound message as "OUTBOUND M1: YES BOB, THIS IS BILL, WHAT'S UP?" in the output display area 135-1 to allow a user BILL 250-1 to follow the conversation by viewing the output display area 135-1. When the reply message 218-1 reaches the message server 110, the message handler process 122 (e.g., the message detector 123 in example illustrated in FIG. 4) detects the inbound message 218-1 and processes this message using the other components of the message handler process 122 in order to forward in message 221-1B of the long-lived HTTP connections 210-2 to the client message handler 145-2 for display within the output area 135-2 for viewing by the user BOB 250-2.

Communications in this manner continues between the users BOB and BILL such that, as illustrated in the output display area 135-1 FIG. 5, each user is able to see a complete transcription of all inbound in outbound messages sent to and from the message server 110 for receipt by the messaging clients 130-1 and 130-2. Accordingly, the message handler process 122 is capable of detecting messages 215 or 218 to be sent to a respective destination client message handler 145 and is able to encapsulate these messages 215 or 218 within a message display script 225 and is able to transfer the message display script 225 within an message 221 for receipt by the messaging client 130. As discussed above, the message display script 225 interoperates in conjunction with a message processing script 235 (i.e., JavaScript function) already contained within the client message handler 145 to display the message on the output display area 135.

Another aspect of embodiments of the invention is also illustrated by the example messages exchanged and displayed on the output display area 135-1 illustrated in FIG. 5. Directing attention to inbound message M3 "INBOUND M3: CALL CONTROL: INCOMING CALL FROM BOB: ANSWER Y/N?", in this example, this particular message is generated based upon the message 218 shown in FIG. 1 that is received by the message server 110 from the call control server 190. Specifically, message stream 218 as illustrated in FIG. 1 is received from the call control server 190 to identify a current status or state of telephone calls or other communication session state associated with other devices in communication with each other. In this example, the inbound message M3 indicates to user BILL 250-1 that the user BOB 250-2 is attempting to make an incoming telephone call to Bill's telephone number. It is to be understood that the client message handler 145-1 and/or the message server 110 can be equipped with additional logic (i.e., software) that enables signaling information to be transferred within messages 221 such that the client message handler 145-1 can identify (e.g., using caller identification techniques) names or telephone numbers of people identified within message 221 such that text messages display within the output display area 135-1 are customized.

According to embodiments of the invention then, messages 221 maybe exchanged from a message handler process 122 to a client message handler 145-1 over a long-lived HTTP connection 210 and the content of those messages 221 may include signaling information, application data information, or any other information that can be communicated to the client message handler 145-1. The message processing script 235 can be equipped with additional logic functionality other than that required to simply display the text message within the output display area 135-1. An example of this additional functionality that may be provided by the message processing script 235 is illustrated by the inbound message M3 that tasks the user BILL 250-1 if BILL wishes to answer the incoming telephone call from the user BOB 250-2. If the user BILL 250-1 desires to answer the telephone call, then user BILL 250-1 can, in this example, simply select (e.g., with a pointing device such as a mouse on a graphical user interface 135-1) the answer "Y" to indicate that he desires to answer the incoming telephone call. The message processing script 235 can be equipped with other message processing script logic functionality (e.g., JavaScript) to detect this user input and to automatically send a response message 218 back to the message server 110 for forwarding (e.g., over another long-lived connections 210) to the call control server 190 (FIG. 1) in order to cause the call control server 190 to set up the telephone call between the telephone units (e.g., 191 and 192 in FIG. 1) associated with the users BILL 250-1 and BOB 250-2.

In other words, it is to be understood that the message processing script 235 provided within the messaging page 220 is not limited to simply displaying text messages within the output display area 135. Rather, other functionality such as providing call control logic can be invoked by customized message display or processing script functionality 225 contained within specific messages 221 received over a single long-lived connections 210 by a client messaging handler 145, or contained within the message page 220. This aspect of embodiments of the invention is further illustrated by directing attention to the series of inbound messages M4 through M6 which the message handler process 122 periodically generates based on incoming messages 218 (FIG. 1) received by the message server 120 from the call control server 190. Each message 218 provides periodic status updates as to the state of the telephone call transpiring between telephone units 191 and 192 (i.e., between BOB and BILL) as illustrated FIG. 1.

In addition, it is to be understood that messages can arrive at the server message handler 120 illustrated FIG. 1 from multiple sources and all of such messages (e.g., 215 and 218) can be routed to a client message handler 145 over a single long-lived connection 210. Messages arriving from one source, such as the call control server 190, can contain call signaling information or other data besides text messaging data. Embodiments of the invention are capable of encapsulating this signaling information as message data 230 within a message display script 225. In addition, embodiments of the invention provide that the message processing script 235 embedded within messaging page 220 can contain additional logic such as JavaScript functions which provide for customized processing of such embedded or encapsulated message data 230. The output display area 135 provided by the client message handler 145 to a user 250 can thus be used to provide text messaging capabilities between users as well as providing other information of interest such as call control processing information or call connection or state information regarding the status or state of telephone calls taking place over a communications network 102 such as the public switched telephone network.

Another example illustrates this aspect of embodiments of the invention. In this example, suppose a conference call transpires between users of multiple telephone units 191 through 193. The call control server 190 can monitor status of each telephone unit of each participant within a conference call and can periodically, or in response to certain events, provide call control status messages 218 (FIG. 1) to the server message handler 120 which can provide these as a stream of messages 221 over a single long-lived connections 210 to one or more messaging clients 130, such that users viewing the output display area 135 of these messaging clients 130 can quickly ascertain the status of each participant in a conference call. To extend this example further, since embodiments of the invention provide a mechanism for real-time transfer of message text, data or other signaling information to one or more client message handlers 145, as participants to a conference call join or leave the conference call, call control status messages 218 sent from the call control server 190 to the server message handler 120 can be used to quickly indicate to one or more output display areas 135 of one or more messaging clients 130 that a particular user has entered (i.e., joined) or left a particular conference call.

Since embodiments of the invention do not rely upon a requirement of a client message handler 145 such as a Web browser to be equipped with complex Java virtual machine technology or with other specialized messaging protocols, nor do embodiments require downloaded or preconfigured executable messaging applications or applets, the user desiring to engage in an messaging session with a messaging server 110 can do so from virtually any Web browser coupled to a computer network 101 such as the Internet. Accordingly, the user, for example, visiting a remote location such as a hotel in a remote city can simply obtain access to the Internet to a standard conventional web browser and can obtain access to messaging capabilities in order to communicate with other users or, as illustrated examples above, in order to receive signaling information regarding such things as telephone call status or states. The user does not need to be concerned with whether or not the browser application that he or she is using is equipped with a Java virtual machine (many are not equipped with such technology) nor does the user need to be concerned with downloading and/or configuring the Web browser that he or she is using with any other specific messaging technology (e.g., a plug-in) since conventional Web browsers support basic message display and processing script logic such as JavaScript functionality.

Figure 6:
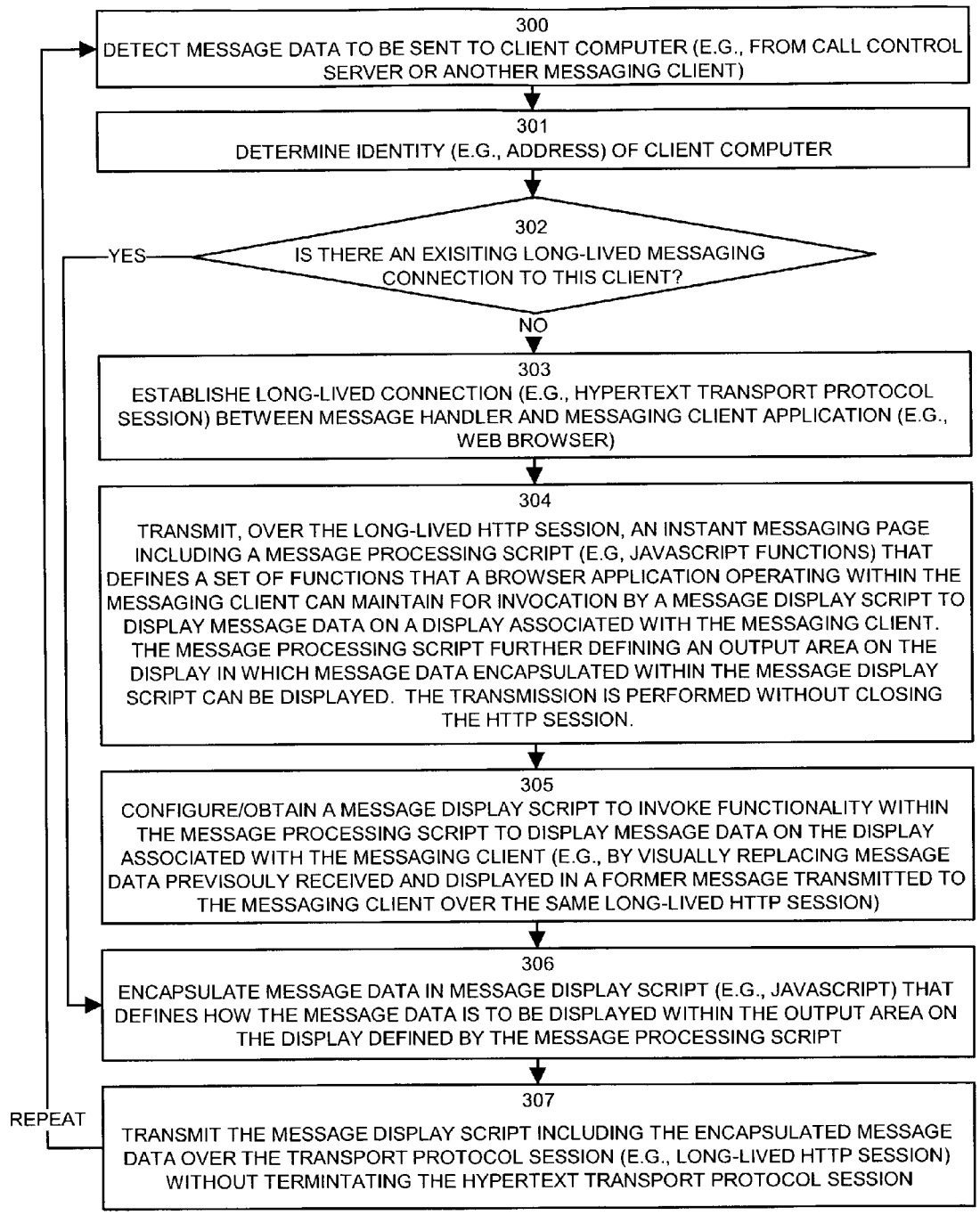
FIG. 6 is a flow chart of processing steps that a server-based message handler application operating on a message server performs according to one embodiment of the invention.

FIG. 6 is a flow chart of processing steps that illustrate message server processing according to one example embodiment of the invention. According to one embodiment of the invention, the message handler process 122 can perform the processing operations illustrated in FIG. 6 in order to provide messaging capabilities as explained herein according to embodiments of the invention.

In step 300, the message handler process 122 detects message data 230 to be sent or otherwise transferred to a messaging client computer system 130. As explained above, the message data 230 may arrive at the message server 110 using any technique such as by receiving the messages 215 or 218 as explained in examples above, or by generating such messages 215, 281 internally.

In step 301, the message handler process 122 determines the identity, such as a network address, of the messaging client computer 130 to which the message data 230 is to be sent. This may be done, for example, by having messages 215 or 218 contain a destination address or other identity that identifies or can be matched to one or more messaging clients 130 to which the message data 230 is to be sent. Once the message handler process 122 determines the identity of the client computer 130, processing proceeds to step 302.

In step 302, the message handler process 122 determines if there is an existing long-lived messaging connection 210 to the messaging client 130 identified in step 301. In other words, in step 302, the message handler process 122 determines if an messaging session has already been set up to a particular messaging client 130 to which the message data 230 is to be sent. If no existing long-lived messaging (e.g., HTTP) connections 210 exists to the messaging client 130 to which the messaging data 230 is to be sent, processing proceeds to steps 303 through 305.

In step 303, the message handler process 122, and specifically the connection maintainer 126, establishes a long-lived connection 210 between the server message handler 120 (i.e., from the message handler process 122) to the client message handler 145 (e.g., web browser) operating within the identified messaging client 130. The long-lived connection 210 may be, for example, a hypertext transport protocol session.

Next, in step 304, the message handler process 122 transmits, over the long-lived HTTP session or connection 210, an messaging page 220 that includes a message processing script 235 (e.g., JavaScript functions) that define a set of functions that a browser application 145 operating within the messaging client 130 can maintain for invocation by a (forthcoming) message display script 225 in order to display message data 230 on a display 140 (e.g., output area 135) associated with the messaging client 130. The message processing script 235 further defines the output area 135 of the display 140 in which the message data 230 encapsulated within the message display script 225 can be displayed. In step 304, the transmission is performed without closing the HTTP long-lived session 210. In this manner, in step 304, the messaging page 220 sent from the messaging server 110 to the messaging client 130 equips or configures a web browser 145 on that messaging client 130 with the proper message processing script 235 in order to handle processing of the incoming messages 221. User interaction is not required for this process and no special downloads are performed nor are specialized protocols used for this purpose.

Next, in step 305, the message handler process 122 configures or otherwise obtains a message display script 225 that can invoke functionality within the message processing script 235 (formerly transferred in step 304 to the messaging client 130) in order to display message data 230 of the display 140 associated with the messaging client 130. The message display script 225 can operate in conjunction with the message processing script 235, for example, to visually replace message data previously received and displayed in a former message 221 transmitted to the messaging client 130 over the same long-lived HTTP session 210. In other words, as multiple messages 221 are sent from the messaging server 110 to the messaging client 130, the message processing script logic 235 can operate in conjunction with message display script logic 225 in order to display message data 230 by the erasing or overwriting formerly displayed message data 230 from a formerly received message 221.

Next, in step 306, the message handler process 122 encapsulates the message data 230 within the proper message display script 225 (configured or otherwise obtain in step 305). The message display script 225 can include JavaScript logic that defines the message data 230 to be displayed within the output area 135 on the display 145 defined by the message processing script 235.

Returning attention briefly now back to step 302, if an existing long-lived messaging connection or session 210 already exists to the selected messaging client 130, processing proceeds from step 302 to step 306 were the aforementioned processing is performed in order to encapsulate the message data within the proper message display script 225.

After step 306 has encapsulated the message data 230 in the message display script 225 (e.g., JavaScript), processing proceeds to step 307.

In step 307, the message server processing of this embodiment of the invention transmits the message display script 225 including the encapsulated message data 230 as in message 221 over the long-lived HTTP session 210 without terminating the HTTP session 210. In this manner, steps 304 and 307 provide data from the message server 110 to the client message handler 145 such as a web browser without breaking the HTTP connection 210. Accordingly, from the perspective of the web browser 145, these two transmissions (step 304 and step 307) appear to be data related to the same web page being received and rendered over the long-lived HTTP connection 210. After processing step 307 is complete, processing returns to step 300 in order to receive and detect the next portion of message data (e.g., from one of the messages 218 or 215 received by the message server 110 as illustrated in FIGS. 1 and 4).

Accordingly, by repeating the processing illustrated in FIG. 6, as more and more message data 230 is detected by the message handler process 122, for example, by receiving streams of message data 215 and 218 from some source, the message handler process 122 is capable of encapsulating the message data within the message display script and transferring this is in message 221 for receipt and processing by the message processing script 235 embedded within the initially transmitted messaging page 220. This processing can continue indefinitely for any number of messages 221, each of which appears, to the web browser, to be portion of data related to the message page 220 originally received over the HTTP connection 210. Thus, by keeping this connection alive 210 for a prolonged. Period of time (i.e., during the entire life of the messaging session), embodiments of the invention allow messaging to take place over a single communication session even though time elapses between transfer of the respective messages 221. To avoid timeout of the long-lived messaging connection 210, the message handler process 122 can operate the connection maintainer 126 to periodically send blank or empty messages 221 prior to a timeout elapsing for the long-lived connection 210.

Figure 7:
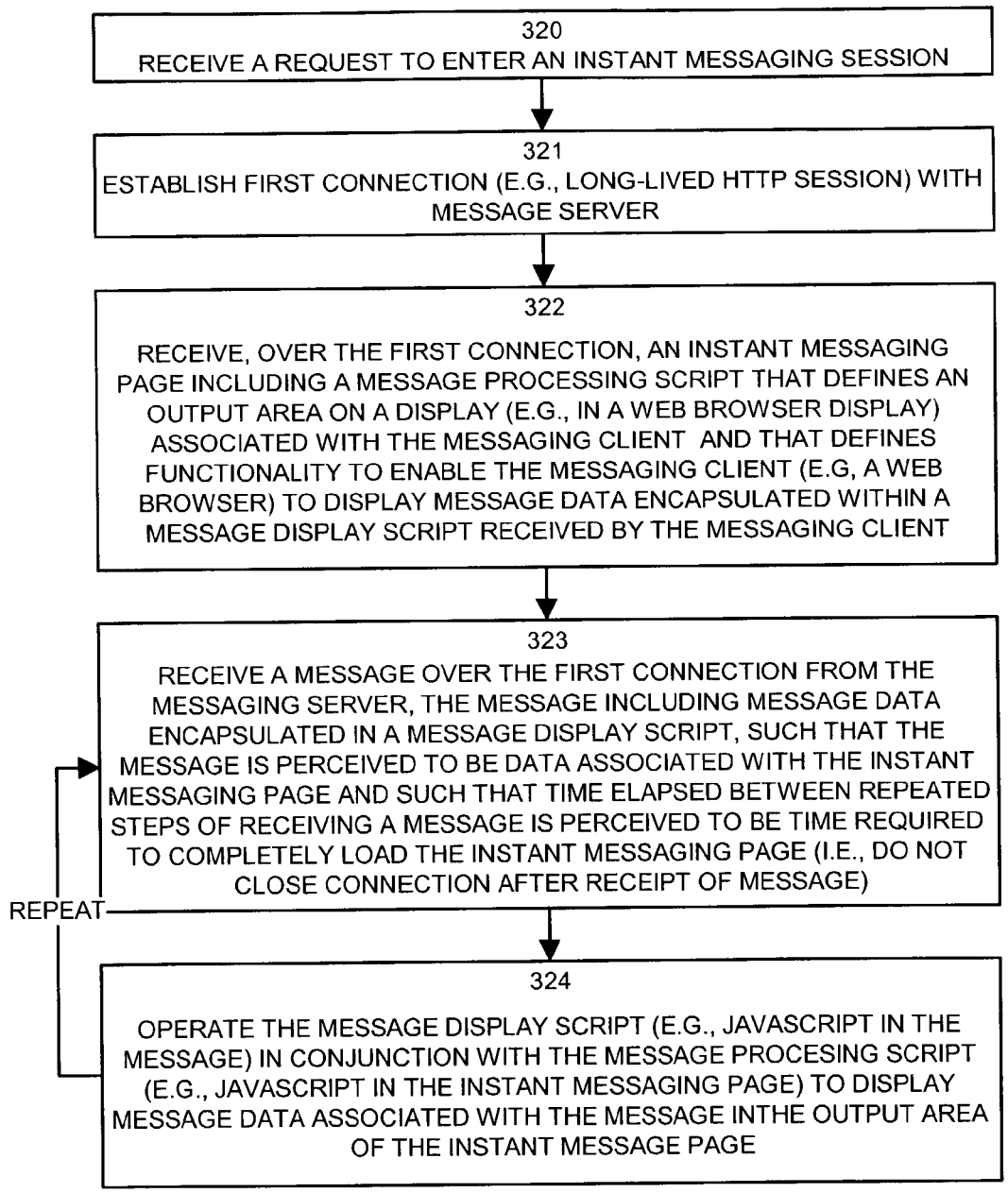
FIG. 7 is a flow chart of processing steps that a client message handler operating on a messaging client can perform according to one example embodiment of the invention.

FIG. 7 is a flow chart of processing steps that illustrate processing performed by a messaging client 130 configured according to one example embodiment of the invention. In particular, the processing illustrated in FIG. 7 is typically performed by a client message handler 145 such as a web browser operating within a messaging client computer system 130 controlled by a user 250.

In step 320, the client message handler 145 receives a request to enter an messaging session. As an example, a user 250 of the client message handler 145 may visit a particular web page of a web site which allows the user to select in message engagement function. This may cause the message 218 to be sent to the client message handler 145 in the message server 110 which thus triggers the processing discussed above with respect to FIG. 6 in order to transfer the messaging page 220 back to the requesting client message handler 145 to begin the establishment of the long-lived HTTP connection 210. It is to be understood that there can be many ways of initiating an messaging session to trigger transfer of the messaging page 220 to a messaging client 130.

In step 321, the client message handler 145 establishes the first connection 210 such as a long-lived HTTP session with the message server 110. This involves, for example, performing the initial TCP/IP connection setup procedure.

Next, in step 322, the client message handler 145 receives, over the first connection 210, an messaging page 220 including a message processing script 235 that defines an output area 135 on the display 140 associated with the messaging client 130. The message processing script 235 (embedded, for example, as JavaScript within the messaging page 220, which may be a web page formatted using the hypertext markup language) defines functionality to enable the messaging client 130 to display message data 230 encapsulated within a message display script 225 received by the messaging client 130.

In step 323, the client message handler 145 receives in message 221 over the first connection 210 from the messaging server 110. The message 221 includes message data 230 encapsulated in the message display script 225. The client message handler 145 perceives the message to be data associated with the messaging page 220. Any time that elapses between repeated steps of receiving in message 221 is thus perceived by the client message handler 145 to be time required to completely load the message page 220 and thus the client message handler 145 does not close the connection 210 after receipt of the message 221.

Next, in step 324, the client message handler 145 operates the message display script 225 in conjunction with the message processing script 235 to display the message data 230 (received within the message 221) in the output display area 135 of the message page 220. After display of the message data 230 in the output display area 135, processing proceeds from step 324 back to step 323 in order to wait and receive the next the message 221 over the long-lived connection 210. In this manner, embodiments of the invention can continually transmit messages over the same long-lived HTTP connection and the web browser 145 believes the messages 221 are data being received for a single web page. Upon reception of each message 221, the message processing script detects the presence of the message display script and operates a display message function (an example of which is provided in the message processing script code segment discussed above) in order to extract the message data from the message 221 for display within the output display area 135.

Since embodiments of the invention rely on baseline Web technologies which are preexistent in computerized device platforms, embodiments of the invention can expand the capabilities of applications to exchange messaging information in support of systems that go beyond the scope of user to user text based messaging systems.

As an example, types of example applications that can directly benefit from embodiments of the invention are such systems as real-time financial news and quote services, emergency weather and disaster alerting services, multi-player games, and monitoring/notification systems of many types. Another use of the technology provided by embodiments of the invention is to enable application clients that control telephone systems in ways that save money or enhance productivity for users and enterprises. As an example, one use of the technology provided by embodiments of the invention is to enable real-time telephone call control from nothing but an ordinary web client, without the use of customized Java applications, proprietary protocols and without the requirement for downloading and installing specialized software in the client device.

Embodiments of the invention provide a messaging system that is capable of true multi-way communication in real-time (limited only by communication bandwidth between devices within the system), where the endpoint devices need ONLY be capable of supporting standard simple HTML and JavaScript. One reason that this is beneficial is that it enables messaging application developers to create applications that use the messaging technology provided by embodiments of the invention that can run on computers and other devices which support nothing more than standard ordinary web-browsers.

To exemplify the importance of this aspect of embodiments of the invention, consider the design and operation of the conventional messaging applications discussed above. Each one of these conventional messaging systems requires the client computer device to obtain and install special device-resident messaging application code which is dedicated to that conventional messaging application. This conventional application code remains installed in the client device even when the messaging application is not in use, thus consuming storage space and potentially processing resources when a client user of the device is not performing messaging processing. In addition, in order to improve a conventional end-user client such as by providing a new release of an messaging system with additional features, the user must again obtain (i.e., download) the newest version of the messaging client application code and must install such code using a manual procedure. Creating and testing this end user code is enormously expensive; it is very difficult to manage the upgrades and convince end users to download a new version. In addition, in some cases, it is a major problem to get a user to download the application client in the first place. Within a business environment, many enterprises do not allow or severely restrict the kinds of applications which can be downloaded and/or installed on a computer within the enterprise environment. Embodiments of the present invention solve these problems by requiring no manual download operation at all, nor does this invention require any special plug-in or browser enhancement such as a Java Virtual Machine.

Embodiments of the invention are based in part on two system elements. The first element provides a messaging web server configured according to one embodiment of the invention which does not close a TCP protocol connection to a messaging web client (also configured according to one embodiment of the invention as well) after the server has finished sending an initial response. From the point of view of the web client, the server has not in fact finished responding. The web client 'believes' that the network is acting a bit slow, and that the requested data is simply taking its time to make its way back to the requesting client. To keep the connection "alive", the server can transmit null data so as to let the client not close the connection. In essence, the messages are sent to the client computer from the server in slow drabs, message by message, over a continuously open single message connection through which or from which the client believes it is only receiving one message. Each individual message is sent 'instantly' (i.e. as soon as possible) by the server and is interjected into the continuously open message connection to the client, but from the point of view of the web client and http protocol, the message never seems to finish arriving. The client thus displays the message data and the client continues to wait for additional data, with the understanding that the first message that established the initial message connection has never completely arrived at the client.

The second element or component configured according to one embodiment of the invention operates such that the messages sent over the continuously open connection between server in the client are encapsulated within JavaScript in such a way that the receiving web messaging client uses the new message as part of content which replaces the former content the display window. This is done within JavaScript by using code which refreshes certain variables. For example, a variable "old-messages" can be appended with the former 'new-message', and then 'new-message' can be updated to reflect the new message coming in.

A fully working example embodiment of the invention including the aforementioned client and server system elements is disclosed in the Appendix submitted as part of the formerly referenced Provisional Application for patent referenced above. It is to be understood that although the example system described in the Appendix implements only messaging, the same system can be configured to pass messages in real-time between any user interface within a web-browser and a server. It is not required that the server be primarily a web server and that the client be an messaging client for use by a user to receive only text messages. Rather, the "server message handler" configured according to embodiments of the invention can operate as a messaging gateway which relays real-time messages to and from a back-end web server and a user interface operating on the client computing system platform can implement the client messaging handler according to embodiments of invention to receive these messages for a purpose other than displaying text to the user on the client.

In other words, embodiments of the invention provide a messaging client design and a messaging server design which can be used for messaging or which can be used to pass text or other types of data between a back-end application and the server message handler 120 which forward this data as message 221 to a client application operating in conjunction with the client message handler 145 implemented according to embodiments of the invention using simple HTML and JavaScript, without the requirement for use of downloading specialized applications or utilizing specialized plug-ins or virtual machines (e.g., job of virtual machines) within the client computing platform.

Embodiments of the system described herein thus make it possible to replace a proprietary message protocol between client and server by a standard web protocol such as HTTP. The benefits to the makers of such a system can include (but are not limited to) the ability to write a purely web-based rich UI which incorporates real-time server feedback, the ease of deploying/managing/upgrading such UI clients (only a URL needs to be distributed), and the simplicity gained by utilizing standardized web protocols (HTTP over TCP and SSL) which allow operation of embodiments of the invention to pass messages between firewalls which might otherwise exclude proprietary messaging protocols.

In the absence of embodiments of the present invention, a messaging system developer is limited to either deploying clients which are written with compiled or interpreted code (such as C++, Java, etc.), or to the very restricted possibilities that are contained within a "pure-pull" Web model. With an embodiment of the invention, the system developer is equipped with the advantages of the simplicity of a web client/server model, but all the richness of a code-based client.

In addition to the aforementioned embodiments, another embodiment provides a messaging server that can maintain a long-lived connection to a back-end system such as an application server. This connection, like the messaging connection between the client message handler 145 and the server message handler 120, can be kept open for as long as the web messaging client has a connection open to the web server element described here. Such embodiments can enable an ordinary web client (with nothing but html and JavaScript support) to become a full SIP client (SIP is an IETF standards-track protocol that is used for a wide variety of real-time signaling functions). The server message handler technology described herein is used to maintain a connection to a SIP server for the life of the http connection from the ordinary web browser It is also to be understood that users of this system may in fact be computers or other devices themselves, and the messages 221 passed might never been seen by a human being. A very large number of Internet applications require the real-time passing of data messages from one host on the internet to another, or among a group of internet hosts and can benefit from this invention.

What is claimed is:

1. In a messaging server, a method for processing message data, the method comprising the steps of:
    receiving a first message to be sent to a messaging client;
    establishing a first connection to the messaging client;
    transmitting a message processing script and the first message over the first connection to the messaging client, the message processing script enabling the messaging client to display the first message and to receive and display at least one second message over the first connection to the messaging client independent of the operating system of the messaging client and exclusive of any messaging software residing and previously stored on the messaging client;
    maintaining the first connection in an open state after transmitting the first message to the messaging client;
    receiving a second message to be sent to the messaging client; transmitting the second message over the first connection to the messaging client for receipt by the message processing script, while continuing to maintain the first connection in an open state; and
    repeating, for subsequent second messages, the steps of maintaining the first connection in an open state, receiving a second message, and transmitting the second message such that separate second messages are transmitted from the messaging server to the messaging client over the first connection.

2. The method of claim 1 wherein:
    the step of establishing a first connection to a messaging client comprises the step of opening a transport protocol session between a message handler and the messaging client;
    the steps of transmitting the first and second messages over the first connection to the messaging client each include the steps of:
    encapsulating message data within a message display script;
    transmitting the message display script over the transport protocol session without terminating the transport protocol session such that the messaging processing script on messaging client receives and displays the message data encapsulated within the message display script and does not close the transport protocol session.

3. The method of claim 2 wherein the transport protocol session is a markup language transport protocol session between the messaging server and the messaging client and wherein the message processing script is included in an messaging page and defines a set of functions that a browser application operating within the messaging client can maintain for invocation by a message display script to display the message data on a display associated with the message client when the first and second message are received within the messaging client.

4. The method of claim 3 wherein the step of transmitting the second message over the first connection to the messaging client comprises the step of:
    configuring the message display script to invoke functionality within the message processing script to display the message data on the display associated with the messaging client by visually modifying message data previously displayed in a former message transmitted to the messaging client.

5. The method of claim 4 wherein:
    and wherein the step of repeating causes the messaging server to transmit a series of second messages, each containing message data encapsulated in a message display script, to the messaging client over the first connection, such that the messaging client receives the second messages at separate times over the same first connection and such that the messaging client perceives the receipt of multiple second messages to be related to receipt of a single messaging page of data.

6. The method of claim 1 wherein:

the message processing script and the message display script are Javascript;

the first connection is a long lived hypertext transport protocol session;

wherein the first and second messages are formatted only from at least one of a hypertext markup language and a scripting language; and wherein the steps of transmitting the first and second messages comprise the steps of transmitting the first and second message using only a hypertext transport protocol over the long lived hypertext transport protocol session.

7. The method of claim 1 wherein the first connection is a continuously open message connection and wherein the step of maintaining the first connection in an open state comprises the steps of:

transmitting null data over the first connection during at least one period of time when no second messages are received for transmit over the first connection such that the messaging server and messaging client do not close the first connection.

8. The method of claim 7 wherein the step of transmitting null data over the first connection is performed at a time interval between the transmission of the first and second messages that is less than a timeout period of a session protocol associated with the first connection.

9. The method of claim 1 wherein at least one of the first message and second message are received from a call control server and include telephone status information as message data to allow a user of the messaging client to monitor at least one telephone call on a communications network; and wherein the steps of receiving the first and second messages comprise the step of:

receiving the first and second messages from a call control server that monitors operation of the at least one phone call and wherein the message data indicates a status of the at least one phone call on a display of the messaging client.

10. The method of claim 1 wherein the messaging client perceives the repeated step of transmitting the second message over the first connection to the message client to be the receipt of inbound message page data associated with the messaging page, such that time that elapses between repeated steps of receiving a second message is perceived by the messaging client to be time required to load the single messaging page.

11. In a messaging client, a method for processing message data, the method comprising the steps of:

establishing a first connection with a messaging server;

receiving, over the first connection, an messaging page including a message processing script that defines an output area in the messaging page and that defines functionality to enable the messaging client to display message data encapsulated within a message display script received by the messaging client independent of the operating system of the messaging client and exclusive of any messaging software residing and previously stored on the messaging client;

receiving a first message over the first connection from the messaging server, the first message including message data encapsulated ha a message display script;

operating the message display script in conjunction with the message processing script to display first message data associated with the first message in the output area of the messaging page;

receiving a second message over the fast connection from the messaging server, the second message including message data encapsulated in a message display script;

operating the message display script of the second message in conjunction with the message processing script to display second message data associated with the second message in the output area of the messaging page; and repeating the steps of receiving a second message and operating the message display script of the second message such that message data in a series of second messages is received over the same first connection that remains in an open state between the message client and messaging server and is displayed to a user of the messaging client.

12. The method of claim 11 wherein the first connection is the only connection used to receive the first and second messages during the step of repeating.

13. The method of claim 11 wherein the messaging page, the first and second messages, and the scripting language are comprised only of JavaScript and a markup language.

14. The method of claim 11 wherein the steps of receiving the first message and receiving the second message comprise the step of operating only a hypertext transport protocol as a means to receive the first and second messages from the messaging server.

15. The method of claim 11 wherein the step of establishing a first connection with the messaging server comprises the steps of;

operating a browser to receive a request to enter an messaging session;

in response to receiving the request, establishing the first connection to the messaging server from the browser; and wherein the message processing script received in the messaging page defines functionality to define an output area within a browser and defines functionality that can be invoked by a message display script containing encapsulated message data that causes the browser to display the message data in the output area upon receipt of the message display script.

16. The method of claim 15 wherein the step of operating the message display script of the second message in conjunction with the message processing script to display second message data associated with the second message in the output area of the messaging page comprises the steps of:

retrieving the message data from the second message; and operating the message display script that encapsulated the message data in conjunction with the message processing script included in the message page to display the message data in the output area of the browser in a manner that overwrites at least a portion of formerly displayed message data in the output area, such that repeated receipt of second messages over the first connection causes the message display script of each second message to invoke functionality of the message processing script in the messaging page to display the message data of each respective second message in the output area of the messaging page in the browser.

17. The method of claim 16 wherein the browser perceives the repeated receipt of second message to be data associated with the messaging page, such that time that elapses between repeated step of receiving a second message is perceived by the browser to be time required to load the single messaging page.

18. A method for receiving messages, the method comprising the steps of:
  opening a messaging connection between a messaging client and a messaging server;
  receiving message data of a first type over the open message connection;
  maintaining the message connection in an open state between the messaging client and the messaging server, such that the messaging client perceives that message data received over the messaging connection is not yet completely received;
  receiving message data of a second type over the open messaging connection; and
  repeating the steps of receiving massage data of a first type, maintaining the message connection in an open state, and receiving message data of a second type such that individual messages contained in the message data of the first and second types are successively received for display on the messaging client independent of the operating system thereof and exclusive of messaging software residing and previously stored on the messaging client and such that that the messaging client perceives that message data received over the messaging connection is not yet completely received.

19. A messaging system comprising:
  a messaging client;
  a messaging server;
  a computer network coupling the messaging client and the messaging server;
  the messaging client configured to:
    establish a message connection with the messaging server over the computer network using only hypertext-related protocols and a simple scripting language;
    receive a message connection response from the server indicating that the message connection is an open message connection;
    receiving message data of a first type containing the contents of a first message over the open message connection;
    receiving message data of a second type containing the contents of a second message over the open message connection;
    repeating the steps of receiving message data while maintaining the open message connection and while awaiting delivery of a message termination indicator indicating that a message associated with the message connection has been completely received by the messaging client;
  the messaging server configured to:
    establish a message connection with the messaging client over the computer network using only hypertext-related protocols and a simple scripting language;
    transmit a message connection response to the messaging client identifying the message connection has an open message connection;
    transmitting message data of a first type containing the contents of a first message from the messaging server over the open message connection to the messaging client;
    transmitting message data of a second type containing the contents of a second message over the open message connection to the messaging client;
    repeating the steps of transmitting in order to provide a continuous stream of message data over the open message connection, the continuous stream of message data comprising a plurality of messages perceived by the messaging client as a single continuous message received over the open message connection for display on the messaging client independent of the operating system thereof and exclusive of proprietary messaging software residing and previously stored on the messaging client.

20. A messaging server computer system comprising:
  at least one communications interface;
  a memory;
  a processor; and
  an interconnection mechanism coupling the at least one communications interface, the memory and the processor;
  wherein the memory is encoded with a server message handler application that when performed on the processor, produces a server message handler process that causes the messaging server computer system to processing message data by performing the operations of:
  receiving, over the at least one communications interface, a first message to be sent to a messaging client;
  establishing a first connection to the messaging client over the at least one communications interface;
  transmitting a message processing script and the first message over the first connection to the messaging client, the message processing script enabling the messaging client to display the first message and to receive and display at least one second message over the first connection to the messaging client independent of the operating system thereof and exclusive of proprietary messaging software residing and previously stored on the messaging client;
  maintaining the first connection in an open state after transmitting the first message to the messaging client;
  receiving, over the at least one communications interface, a second message to be sent to the messaging client;
  transmitting the second message over the first connection to the messaging client for receipt by the message processing script, while continuing to maintain the first connection in an open state; and
  repeating, for subsequent second messages, the steps of maintaining the first connection in an open state, receiving a second message, and transmitting the second message such that separate second messages are transmitted from the messaging server to the messaging client over the first connection.

21. The message server of claim 20 wherein when the processor performs the step of establishing a first connection to a messaging client, the processor performs the step of opening a transport protocol session between a message handler and the messaging client;
  wherein when the processor performs the step of transmitting the first and second messages over the first connection to the messaging client, the processor performs the steps of:
  encapsulating message data within a message display script; and
  transmitting the message display script over the transport protocol session without terminating the transport protocol session such that the messaging processing script on messaging client receives and displays the message data encapsulated within the message display script and does not close the transport protocol session.

22. The message server of claim 21 wherein the transport protocol session is a hypertext transport protocol session between the messaging server and the messaging client and wherein the message processing script is included in an messaging page and defines a set of functions that a browser application operating within the messaging client can maintain for invocation by a message display script to display the message data on a display associated with the message client when the first and second message are received within the messaging client.

23. The message server of claim 22 wherein when the processor performs the step of transmitting the second message over the first connection to the messaging client, the processor performs the step of:
configuring the message display script to invoke functionality within the message processing script to display the message data on the display associated with the messaging client by visually replacing message data previously displayed in a former message transmitted to the messaging client.

24. The message server of claim 23 wherein:
the message processing script and the message display script are JavaScript; and
wherein when the processor performs the step of repeating, the processor causes the messaging server to transmit a series of second messages, each containing message data encapsulated in a message display script, to the messaging client over the first connection, such that the messaging client receives the second messages at separate times over the same first connection and such that the messaging client perceives the receipt of multiple second messages to be related to receipt of a single messaging page of data.

25. The message server of claim 20 wherein:
the first connection is a long lived hypertext transport protocol session;
wherein the first and second messages are formatted only from at least one of a hypertext markup language and a scripting language; and
wherein when the processor performs each of the steps of transmitting the first and second messages the processor performs the step of transmitting the first and second message using only a hypertext transport protocol over the long lived hypertext transport protocol session.

26. The message server of claim 20 wherein the first connection is a continuously open message connection and wherein the step of maintaining the first connection in an open state comprises the steps of:
transmitting null data over the first connection during at least one period of time when no second messages are received for transmit over the first connection such that the messaging server and messaging client do not close the first connection.

27. The message server of claim 26 wherein the step of transmitting null data over the first connection is performed at a time interval between the transmission of the first and second messages that is less than a timeout period of a session protocol associated with the first connection.

28. The message server of claim 20 wherein at least one of the first message and second message are received from a call control server and include telephone status information as message data to allow a user of the messaging client to monitor at least one telephone call on a communications network; and
wherein when the processor performs each of the steps of receiving the first and second messages, the processor performs the step of:
receiving the first and second messages from a call control server that monitors operation of the at least one phone call and wherein the message data indicates a status of the at least one phone call on a display of the messaging client.

29. The message server of claim 20 wherein the messaging client perceives the repeated step of transmitting the second message over the first connection to the message client to be the receipt of inbound message page data associated with the messaging page, such that time that elapses between repeated steps of receiving a second message is perceived by the messaging client to be time required to load the single messaging page.

30. A messaging client computer system comprising:
at least one communications interface;
a memory;
a processor;
a display; and
an interconnection mechanism coupling the at least one communications interface, the memory, the processor and the display;
wherein the memory is encoded with a client message handler application that when performed on the processor, produces a client message handler process that causes the messaging client computer system to process message data by performing the operations of:
establishing a first connection with a messaging server over the at least one communications interface;
receiving, over the first connection, an messaging page including a message processing script that defines an output area in the messaging page and that defines functionality to enable the messaging client to display message data encapsulated within a message display script received by the messaging client;
receiving a first message over the first connection from the messaging server, the first message including message data encapsulated in a message display script;
operating, on the processor, the message display script in conjunction with the message processing script to display first message data associated with the first message in the output area of the messaging page independent of the operating system and exclusive of proprietary messaging software residing and previously stored on the messaging client;
receiving a second message over the first connection from the messaging server, the second message including message data encapsulated in a message display script;
operating the message display script of the second message in conjunction with the message processing script to display, on the display, second message data associated with the second message in the output area of the messaging page; and
repeating the steps of receiving a second message and operating the message display script of the second message such that message data in a series of second messages is received over the same first connection that remains in an open state between the message client and messaging server and is displayed to a user of the messaging client.

31. The messaging client of claim 30 wherein the first connection is the only connection used to receive the first and second messages during the step of repeating.

32. The messaging client of claim 30 wherein the messaging page, the first and second messages, and the scripting language are comprised only of JavaScript and a markup language.

33. The messaging client of claim 30 wherein when the processor performs the steps of receiving the first message and receiving the second message the processor performs the steps of operating only a hypertext transport protocol as a means to receive the first and second messages from the messaging server.

34. The messaging client of claim 30 wherein when the processor performs the steps of establishing a first connection with the messaging server the processor performs the steps of:
   operating a browser to receive a request to enter an messaging session;
   in response to receiving the request, establishing the first connection to the messaging server from the browser; and
   wherein the message processing script received in the messaging page defies functionality to define an output area within a browser and defines functionality that can be invoked by a message display script containing encapsulated message data that causes the browser to display the message data in the output area upon receipt of the message display script.

35. The messaging client of claim 34 wherein when the processor performs the steps of operating the message display script of the second message in conjunction with the message processing script to display second message data associated with the second message in the output area of the messaging page the processor performs the steps of:
   retrieving the message data from the second message; and
   operating the message display script that encapsulated the message data in conjunction with the message processing script included in the message page to display the message data in the output area of the browser in a manner that ovemmites at least a portion of formerly displayed message data in the output area, such that repeated receipt of second messages over the first connection causes the message display script of each second message to invoke functionality of the message processing script in the messaging page to display the message data of each respective second message in the output area of the messaging page in the browser.

36. The messaging client of claim 35 wherein the browser perceives the repeated receipt of second message to be data associated with the messaging page, such that time that elapses between repeated step of receiving a second message is perceived by the browser to be time required to load the single messaging page.

37. A messaging system comprising:
   a messaging client;
   a messaging server;
   a computer network coupling the messaging client and the messaging server;
   the messaging client configured to provide:
      means for establishing a message connection with the messaging server over the computer network using only hypertext-related protocols and a simple scripting language;
      means for receiving a message connection response from the server indicating that the message connection is an open message connection;
      means for receiving message data of a first type containing the contents of a first message over the open message connection;
      means for receiving message data of a second type containing the contents of a second message over the open message connection;
      means for repeating the steps of receiving message data while maintaining the open message connection and while awaiting delivery of a message termination indicator indicating that a message associated with the message connection has been completely received by the messaging client;
   the messaging server configured to provide:
      means for establishing a message connection with the messaging client over the computer network using only hypertext-related protocols and a simple scripting language;
      means for transmitting a message connection response to the messaging server identifying the message connection has an open message connection;
      means for transmitting message data of a first type containing the contents of a first message from the messaging server over the open message connection to the messaging client;
      means for transmitting message data of a second type containing the contents of a second message over the open message connection to the messaging client
      means for repeating the steps of transmitting in order to provide a continuous stream of message data over the open message connection, the continuous stream of message data comprising a plurality of messages perceived by the messaging client as a single continuous message received over the open message connection for display on the messaging client independent of the operating system thereof and exclusive of proprietary messaging software residing and previously stored on the messaging client.

38. A computer program product having a computer-readable medium including computer program logic encoded thereon that performed on a processor in a computerized device having a coupling of a memory, a processor, and at least one communications interface provides a method for processing message data by performing the operations of:
   receiving a first message to be sent to a messaging client;
   establishing a first connection to the messaging client;
   transmitting a message processing script and the first message over the first connection to the messaging client, the message processing script enabling the messaging client to display the first message and to receive and display at least one second message over the first connection to the messaging client independent of the operating system thereof and exclusive of proprietary messaging software residing and previously stored on the messaging client;
   maintaining the first connection in an open state after transmitting the first message to the messaging client;
   receiving a second message to be sent to the messaging client;
   transmitting the second message over the first connection to the messaging client for receipt by the message processing script, while continuing to maintain the first connection in an open state; and
   repeating, for subsequent second messages, the steps of maintaining the first connection in an open state, receiving a second message, and transmitting the second message messages such that separate second message are transmitted from the messaging server to the messaging client over the first connection.

39. A computer program product having a computer-readable medium including computer program logic encoded thereon that performed on a processor in a computerized device having a coupling of a memory, a processor, and at least one communications interface provides a method for processing message data by performing the operations of:
   establishing a first connection with a messaging server;
   receiving, over the first connection, an messaging page including a message processing script that defines an output area in the messaging page and that defines functionality to enable the messaging client to display message data encapsulated within a message display script received by the messaging client independent of the operating system thereof and exclusive of proprietary messaging software residing and previously stored on the messaging client;

receiving a first message over the first connection from the messaging server, the first message including message data encapsulated in a message display script;

operating the message display script in conjunction with the message processing script to display first message data associated with the first message in the output area of the messaging page;

receiving a second message over the first connection from the messaging server, the second message including message data encapsulated in a message display script;

operating the message display script of the second message in conjunction with the message processing script to display second message data associated with the second message in the output area of the messaging page; and repeating the steps of receiving a second message and operating the message display script of the second message such that message data in a series of second messages is received over the same first connection that remains in an open state between the message client and messaging server and is displayed to a user of the messaging client.

* * * * *